(12) United States Patent
Kang et al.

(10) Patent No.: US 11,564,348 B2
(45) Date of Patent: Jan. 31, 2023

(54) MOVING ROBOT AND METHOD OF CONTROLLING THE SAME

(71) Applicant: Samsung Electronics Co., Ltd., Suwon-si (KR)

(72) Inventors: Hyunkoo Kang, Suwon-si (KR); Taegyu Kim, Suwon-si (KR); Hyunki Bae, Suwon-si (KR); Wonyoung Seo, Suwon-si (KR); Jinwook Yoon, Suwon-si (KR); Jihoon Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 17/034,605

(22) Filed: Sep. 28, 2020

(65) Prior Publication Data

US 2021/0100160 A1 Apr. 8, 2021

(30) Foreign Application Priority Data

Oct. 2, 2019 (KR) .................. 10-2019-0122648

(51) Int. Cl.
*G05D 1/00* (2006.01)
*G05D 1/02* (2020.01)
*A01D 34/00* (2006.01)

(52) U.S. Cl.
CPC .......... *A01D 34/008* (2013.01); *G05D 1/005* (2013.01); *G05D 1/0219* (2013.01);
(Continued)

(58) Field of Classification Search
CPC .... A01D 34/008; G05D 1/005; G05D 1/0219; G05D 1/0234; G05D 1/0238;
(Continued)

(56) References Cited

U.S. PATENT DOCUMENTS 9,854,737 B2 * 1/2018 Yamauchi ............ A01D 34/008
10,274,954 B2 4/2019 Balutis et al.
(Continued)

FOREIGN PATENT DOCUMENTS

EP 3 491 906 A1 6/2019
JP 2007-249735 A 9/2007
(Continued)

OTHER PUBLICATIONS

International Search Report dated Jan. 12, 2021, issued in International Application No. PCT/KR2020/012240.
(Continued)

*Primary Examiner* — Bao T Nguyen
(74) *Attorney, Agent, or Firm* — Jefferson IP Law, LLP

(57) ABSTRACT

A mobile robot and a method of controlling the same are provided, and more specifically, a technology of automatically generating a map of a lawn working area by a lawn mower robot. The mobile robot includes one or more tags configured to receive a signal from one or more beacons, a vision sensor configured to distinguish and recognize a first area and a second area on a travelling path of the mobile robot and acquire position information of a boundary line between the first area and the second area, and at least one processor configured to determine position coordinates of the mobile robot based on pre-stored position information of the one or more beacons, determine position coordinates of (Continued)

the boundary line based on the determined position coordinates of the mobile robot and the acquired position information of the boundary line, and generate a map of the first area while travelling along the determined position coordinates of the boundary line.

18 Claims, 16 Drawing Sheets

(52) U.S. Cl.
CPC ......... *G05D 1/0234* (2013.01); *G05D 1/0238* (2013.01); *G05D 1/0274* (2013.01); *G05D 2201/0208* (2013.01)

(58) Field of Classification Search
CPC ......... G05D 1/0274; G05D 2201/0208; G05D 1/0246; G05D 1/0231; G05D 1/0276; G05D 1/028; B25J 11/008; B25J 9/1664; B25J 9/1684; B25J 9/1697; B25J 19/061; B25J 19/023
See application file for complete search history.

(56) References Cited

U.S. PATENT DOCUMENTS

| | | | |
|---|---|---|---|
| 2016/0193729 A1* | 7/2016 | Williams | G05D 1/0274 901/1 |
| 2019/0196469 A1* | 6/2019 | Ebrahimi Afrouzi | A47L 9/2847 |
| 2020/0089970 A1* | 3/2020 | Lee | G05D 1/0231 |

FOREIGN PATENT DOCUMENTS

| | | |
|---|---|---|
| JP | 2011-138507 A | 7/2011 |
| JP | 2017-531423 A | 10/2017 |
| KR | 10-1241411 B1 | 3/2013 |
| KR | 10-2019-0064253 A | 6/2019 |
| KR | 10-2019-0109632 A | 9/2019 |

OTHER PUBLICATIONS

European Search Report dated Oct. 11, 2022; European Appln. No. 20872510.1—1205 / 4019205 PCT/KR2020012240.

* cited by examiner

MOVING ROBOT AND METHOD OF CONTROLLING THE SAME

CROSS-REFERENCE TO RELATED APPLICATION(S)

This application is based on and claims priority under 35 U.S.C. § 119 of a Korean patent application number 10-2019-0122648, filed on Oct. 2, 2019, in the Korean Intellectual Property Office, the disclosure of which is incorporated by reference herein in its entirety.

BACKGROUND

1. Field

The disclosure relates to a mobile robot and a method of controlling the same. More particularly, the disclosure relates to a technology for automatically generating a map of a lawn working area by a lawn mower robot.

2. Description of the Related Art

Robots have been developed for industrial use and provided a part of factory automation. In recent years, the application of robots has been further expanded so that medical robots, aerospace robots, and the like have been developed, and home care robots usable in general homes are also developed. Among the robots, a robot capable of travelling by itself is referred to as a mobile robot. A representative example of the mobile robot used in the outdoor environment of a home is a lawnmower robot.

A lawn mower is a device for trimming the lawn planted in the yard of a home or a playground. Such lawn mowers are also classified into a household-purpose lawn mower used at home and a tractor-purpose lawn mower used in large playgrounds or large farms.

In general, a lawn mower is classified into a riding-type lawn mower having a user ride thereon and mowing the lawn while moving according to the user's driving, a walk behind type or hand type lawn mower that is manually pulled or pushed by a user to mow the lawn, and an autonomous driving lawn mower capable of autonomous driving as described above.

In particular, the manual lawn mower (operated by the user) may hassle the user directly operating the lawn mower, and due to a complicacy of the user directly operating the lawn mower to mow the lawn in the yard in modem busy life, most people hire an outside person to mow the lawn, which incurs employment costs.

Accordingly, there has been development of a lawn mower capable of performing autonomous driving that prevents the additional costs from incurring and reduces the user's labor, that is, a lawn mower robot. Various studies are being conducted to control the mobile performance of the lawnmower robot.

In the case of a mobile robot that autonomously travels indoors, a movable area is limited by walls or furniture, but in the case of a lawnmower robot that autonomously travels outdoors, a movable area needs to be set in advance. In addition, there is a need to limit the movable area so that the lawnmower robot travels in an area where a lawn is planted. Such a lawnmower robot includes a sensor for sensing a result of autonomous driving. For example, an autonomous driving path of a lawnmower robot may be detected using a gyro sensor and an acceleration sensor.

In the lawnmower robot of the related art, a wire may be buried to set an area in which the lawnmower robot is moveable, and an induced current is generated in a coil part of the lawnmower robot, so that the lawnmower robot detects information related to an outline of an operating area and moves within the area set by the wire. In addition, a beacon may be installed in a work area and a trajectory generated by the user directly driving the lawnmower robot with a joystick may be set as a work area.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a lawnmower robot capable of automatically generating a map of a lawn working area using a signal received from a beacon and position information of a boundary line of a lawn obtained through a vision sensor.

Additional aspects will be set forth in part in the description which follows and, in part, will be apparent from the description, or may be learned by practice of the presented embodiments.

In accordance with an aspect of the disclosure, a mobile robot is provided. The mobile robot includes one or more tags configured to receive a signal from one or more beacons, a vision sensor configured to distinguish and recognize a first area and a second area on a travelling path of the mobile robot, and acquire position information of a boundary line between the first area and the second area, and at least one processor configured to determine position coordinates of the mobile robot based on pre-stored position information of the one or more beacons, determine position coordinates of the boundary line based on the determined position coordinates of the mobile robot and the acquired position information of the boundary line, and generate a map of the first area while travelling along the determined position coordinates of the boundary line.

The one or more tags may receive signals from the one or more beacons, which includes three or more beacons, wherein the at least one processor is further configured to determine the position coordinates of the mobile robot based on distances between each of the three or more beacons and the one or more tags.

The one or more tags of the mobile robot includes three or more tags, and each of the three or more tags receives a signal from the one or more beacons, wherein the at least one processor is further configured to determine the position coordinates of the mobile robot based on distances between each of the three or more tags and the one or more beacons.

The at least one processor is further configured to determine the position coordinates of the boundary line based on a distance to the boundary line and an angle of the boundary line with respect to the determined position coordinates of the mobile robot.

The at least one processor is further configured to determine the position coordinates of the boundary line between the first area and the second area acquired by the vision sensor, based on the position coordinates of the mobile robot that is changed according to travel of the mobile robot, and update the determined position coordinates of the boundary line to generate the map of the first area.

The first area includes a lawn area and the second area includes a non-lawn area, wherein the vision sensor is further configured to detect the lawn to distinguish the first area and the second area, and acquire position information of a boundary line between the lawn area and the non-lawn area.

The mobile robot may travel between two beacons installed in advance, wherein in case the mobile robot is located within a predetermined distance from the one or more beacons, the at least one processor is further configured to distinguish and recognize the first area and the second area while rotating at a predetermined angle, and acquire the position information of the boundary line while travelling along the boundary line between the first area and the second area.

The signal transmitted from the one or more beacons to the one or more tags may be an ultra-wideband (UWB) signal.

The mobile robot may further include an alert configured to emit a warning sound regarding a travel inoperability situation of the mobile robot, wherein the alert is further configured to emit the warning sound in case an obstacle is located on the travelling path of the mobile robot or in case the first area and the second area are unable to be distinguished and recognized on the travelling path of the mobile robot.

The mobile robot may further include a display configured to display a warning message regarding a travel inoperability situation of the mobile robot, wherein the display is further configured to display the warning message in case an obstacle is located on the travelling path of the mobile robot or in case the first area and the second are unable to be distinguished and recognized on the travelling path of the mobile robot.

The mobile robot may further include a transceiver configured to transmit data related to at least one of a warning sound or a warning message regarding a travel inoperability situation of the mobile robot to a user terminal.

In accordance with another aspect of the disclosure, a method of controlling a mobile robot is provided. The method includes one or more tags configured to receive a signal from one or more beacons, the method including receiving the signal from the one or more beacons, determining position coordinates of the mobile robot based on pre-stored position information of the one or more beacons, distinguishing and recognizing a first area and a second area on a travelling path of the mobile robot, acquiring position information of a boundary line between the first area and the second area, determining position coordinates of the boundary line based on the determined position coordinates of the mobile robot and the acquired position information of the boundary line, and generating a map of the first area while travelling along the determined position coordinates of the boundary line.

The acquiring of the position information may include receiving signals from the one or more beacons, which includes three or more beacons, wherein the determining of the position coordinates of the mobile robot may include determining the position coordinates of the mobile robot based on distances between each of the three or more beacons and the one or more tags.

The mobile robot may include the one or more tags including three or more tags, wherein the receiving of the position information may include receiving, by each of the three or more tags, a signal from the one or more beacons, and wherein the determining of the position coordinates of the mobile robot may include determining the position coordinates of the mobile robot based on distances between each of the three or more tags and the one or more beacons.

The determining of the position coordinates of the boundary line may include determining the position coordinates of the boundary line based on a distance to the boundary line and an angle of the boundary line with respect to the determined position coordinates of the mobile robot.

The generating of the map of the first area may include determining the position coordinates of the boundary line between the first area and the second area acquired by a vision sensor, based on the position coordinates of the mobile robot that is changed according to travel of the mobile robot, and updating the determined position coordinates of the boundary line to generate the map of the first area.

The first area includes a lawn area and the second area includes a non-lawn area, and the acquiring of the position information of the boundary line between the first area and the second area may include detecting a lawn to distinguish the first area and the second area, and acquiring position information of a boundary line between the lawn area and the non-lawn area.

The mobile robot may travel between two beacons installed in advance, wherein in case the mobile robot is located within a predetermined distance from the one or more beacons, the mobile robot may distinguish and recognize the first area and the second area while rotating at a predetermined angle, and acquire the position information of the boundary line while travelling along the boundary line between the first area and the second area.

The method may further include emitting a warning sound regarding a travel inoperability situation of the mobile robot, and displaying a warning message regarding a travel inoperability situation of the mobile robot, wherein the emitting of the warning sound may include emitting the warning sound in case an obstacle is located on the travelling path of the mobile robot or in case the first area and the second area are unable to be distinguished and recognized on the travelling path of the mobile robot, and wherein the displaying of the warning message may include displaying the warning message in case an obstacle is located on the travelling path of the mobile robot or in case the first area and the second are unable to be distinguished and recognized on the travelling path of the mobile robot.

The method may further include transmitting data related to at least one of a warning sound or a warning message regarding a travel inoperability situation of the mobile robot to a user terminal, wherein the transmitting of the data related to the at least one of the warning sound or the warning message may include transmitting the data related to the at least one of the warning sound or the warning message in case an obstacle is located on the travelling path of the mobile robot or in case the first area and the second are unable to be distinguished and recognized on the travelling path of the mobile robot.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
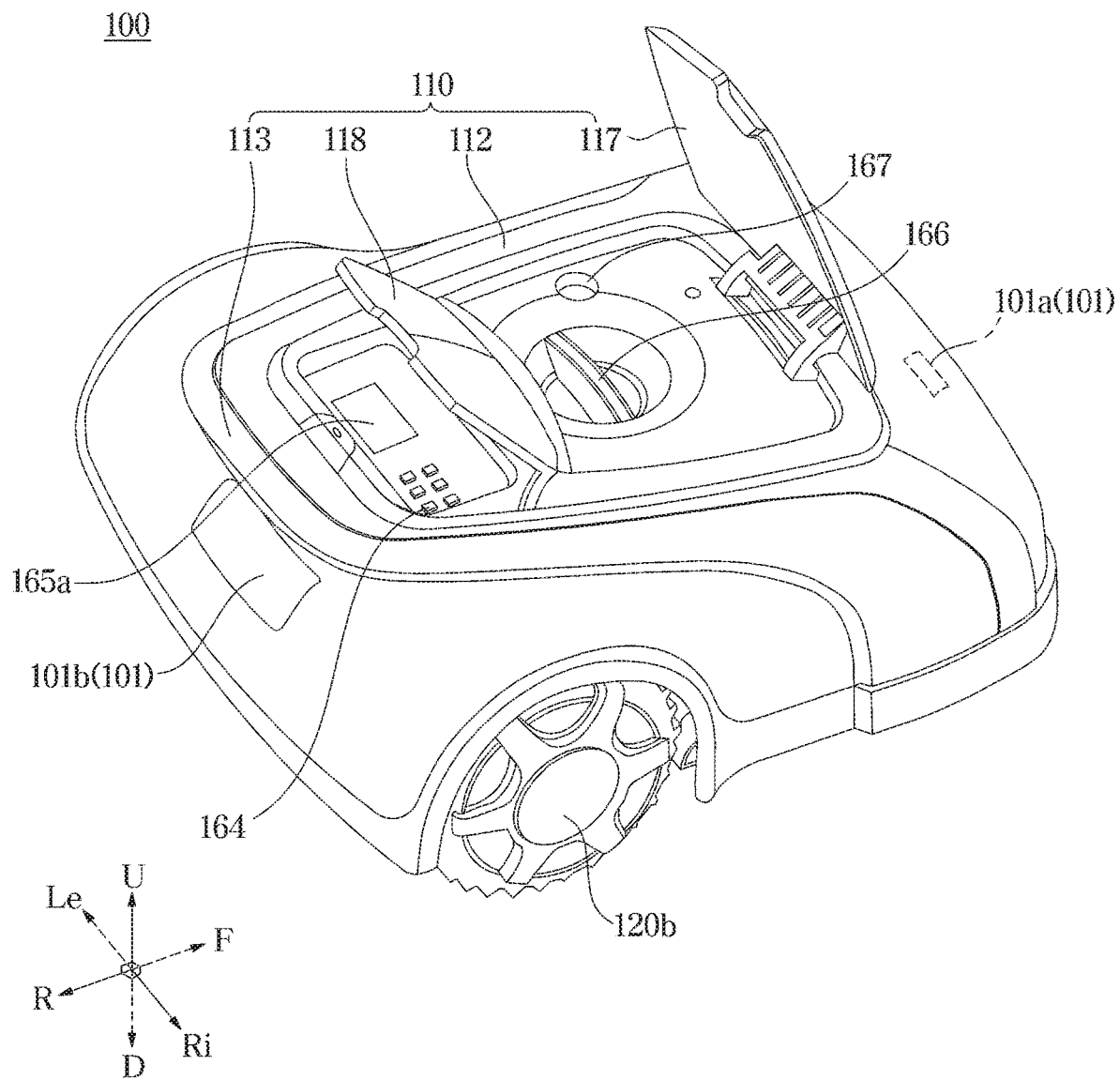
FIG. 1 is a perspective view illustrating a mobile robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the drawings, like reference numerals refer to like parts or components.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

The terms as used throughout the specification, such as "~part", "~module", "~member", "block", etc., may be implemented in software and/or hardware, and a plurality of "~parts", "~modules", "~members", or "~blocks" may be implemented in a single element, or a single "~part", "~module", "~member", or "~block" may include a plurality of elements. It will be further understood that the term "connect" or its derivatives refer both to direct and indirect connection, and the indirect connection includes a connection over a wireless communication network.

It will be understood that, although the terms first, second, etc. may be used herein to describe various components, these components should not be limited by these terms. These terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "front", "upper", "lower", "left", "right", and the like as herein used are defined with respect to the drawings, but the terms may not restrict the shape and position of the respective components.

The terms referring to directions such as "front (F)/rear (R)/left (Le)/right (Ri)/up (U)/down D)" are defined as indicated in the drawings. This is for making the description of the disclosure clear, and it should be understood that each direction may be defined differently depending on where the reference is placed.

Hereinafter, a mobile robot and a control method thereof will be described in detail with reference to the accompanying drawings according to embodiments described below. In the drawings, the same reference numerals denote the same components, and a description of which overlap each other in the embodiments is omitted.

Figure 2:
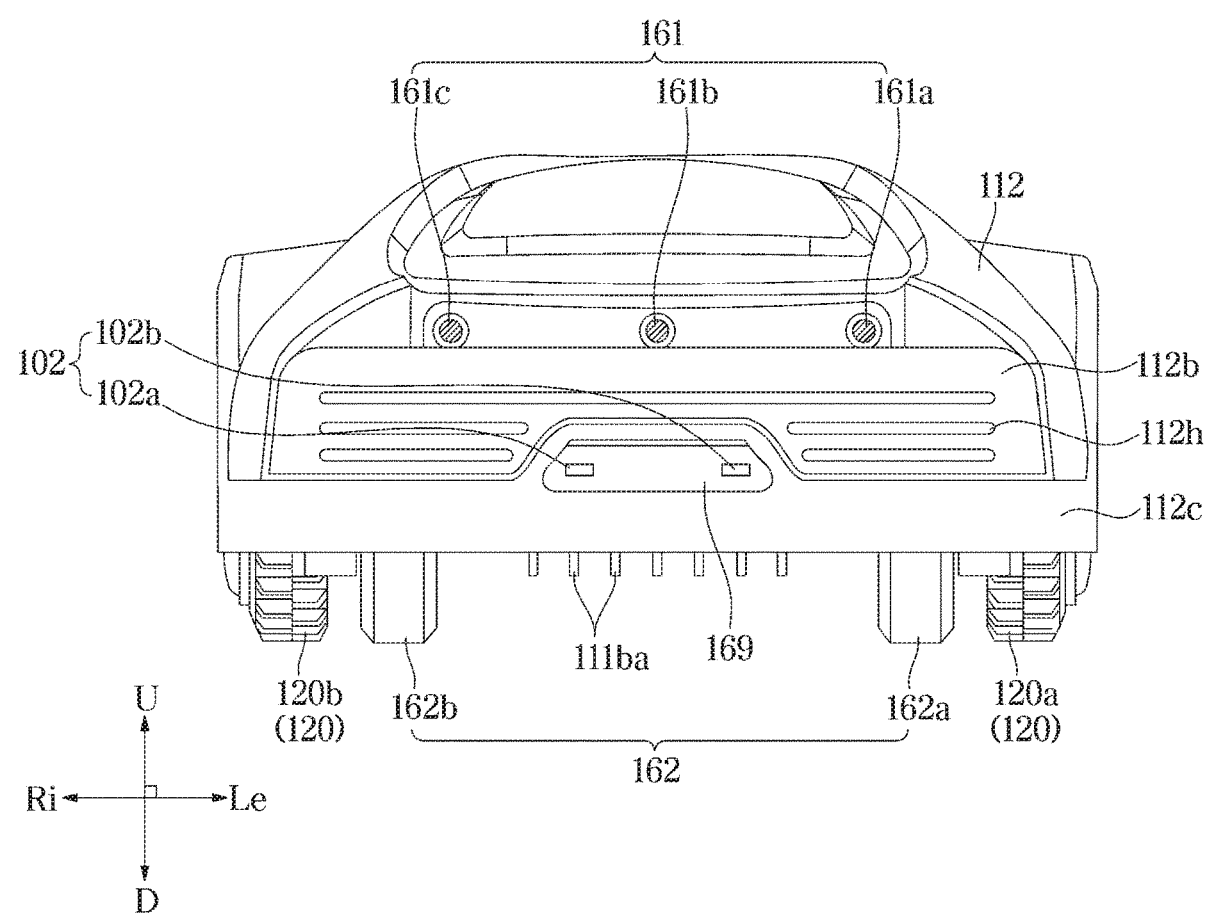
FIG. 2 is a front side elevation view of the mobile robot shown in FIG. 1 according to an embodiment of the disclosure.
Figure 3:
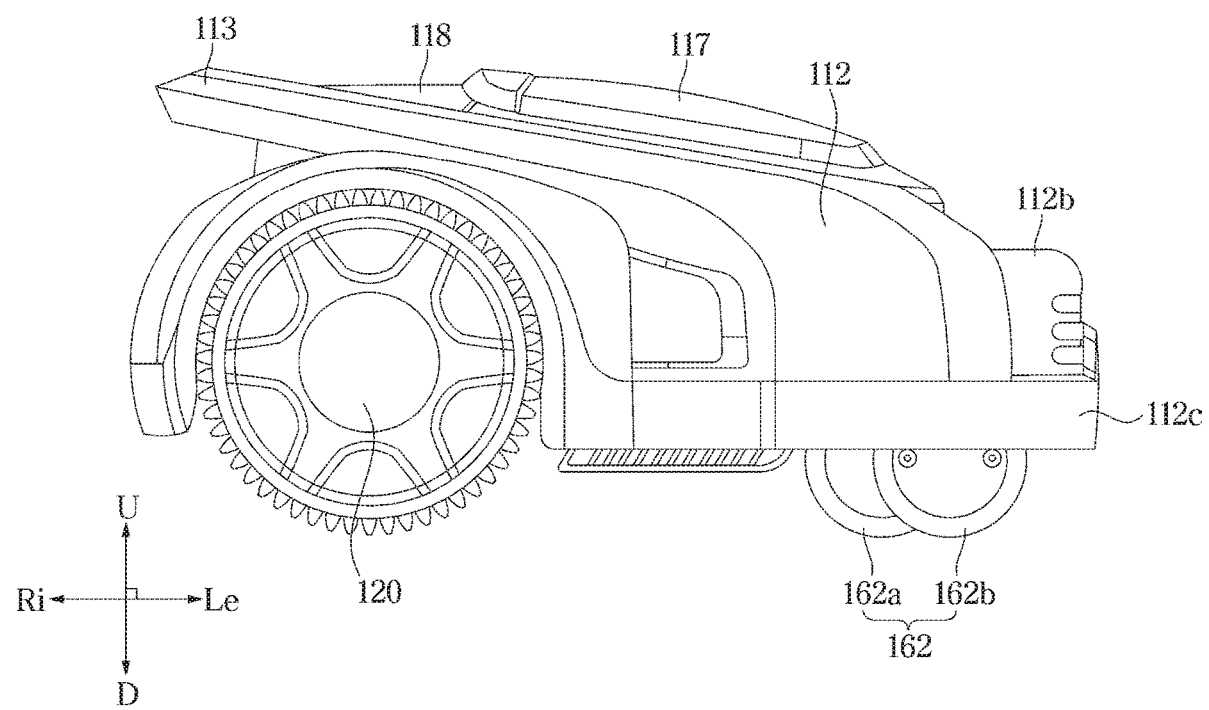
FIG. 3 is a right-side elevation view of the mobile robot shown in FIG. 1 according to an embodiment of the disclosure.
Figure 4:
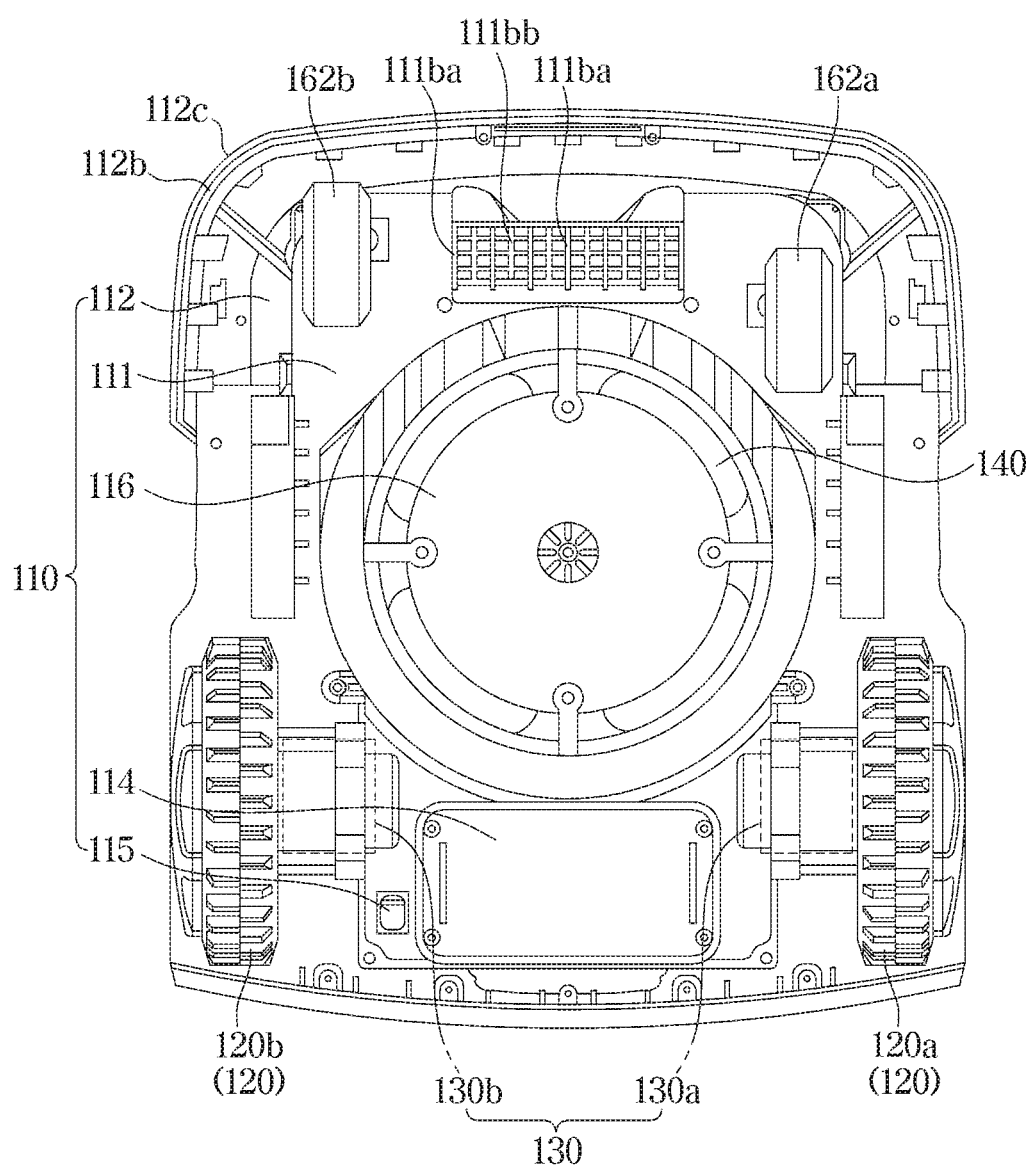
FIG. 4 is a lower side elevation view of the mobile robot shown in FIG. 1 according to an embodiment of the disclosure.
Figure 5:
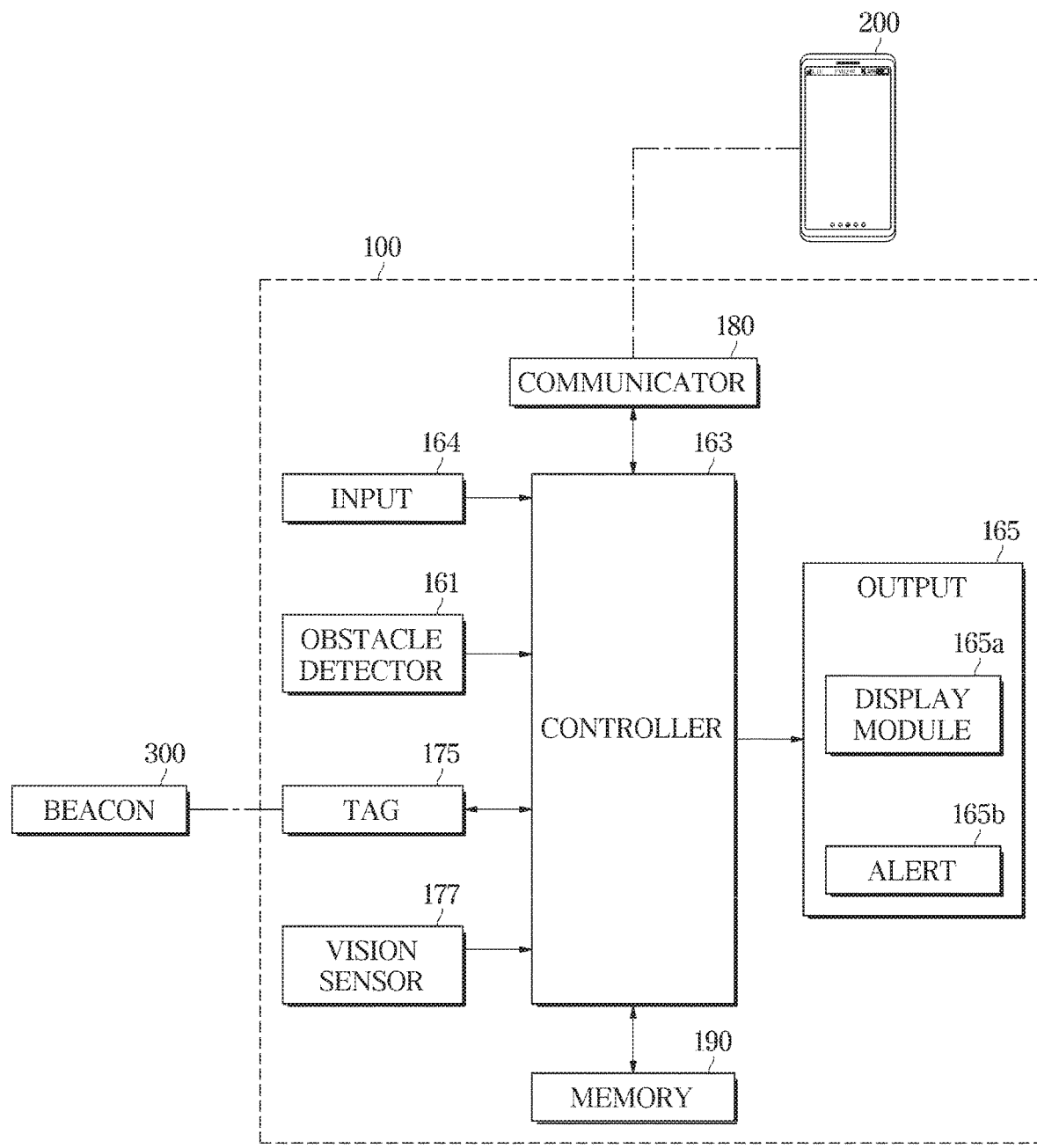
FIG. 5 is a control block diagram illustrating a mobile robot according to an embodiment of the disclosure.

FIG. 1 is a perspective view illustrating a mobile robot according to an embodiment of the disclosure. FIG. 2 is a front side elevation view of the mobile robot shown in FIG. 1 according to an embodiment of the disclosure. FIG. 3 is a right side elevation view of the mobile robot shown in FIG. 1 according to an embodiment of the disclosure. FIG. 4 is a lower side elevation view of the mobile robot shown in FIG. 1 according to an embodiment of the disclosure. FIG. 5 is a control block diagram illustrating a mobile robot according to an embodiment of the disclosure.

The mobile robot 100 according to the disclosed embodiment may correspond to any robot capable of autonomous driving. However, in the following embodiments, the mobile robot 100 will be described using a lawn mower robot as an example.

Referring to FIGS. 1 to 4, the mobile robot 100 includes a body 110 forming the external appearance. The body 110 forms an inner space.

The body 110 includes a first opening and closing part 117 for opening and closing a portion in which a height adjustment part 166 and a height display part 167 are disposed. The first opening and closing part 117 is hinged to a case 112 so as to enable an opening operation and a closing operation. The first opening and closing part 117 is disposed on an upper side of the case 112.

The body 110 includes a second opening and closing part 118 for opening and closing a portion in which a display module 165a and an input 164 are disposed. The second opening and closing part 118 is hinged to the case 112 so as to enable an opening operation and a closing operation. The second opening and closing part 118 is disposed on the upper side of the case 112. The second opening and closing part 118 is disposed behind the first opening and closing part 117. The second opening and closing part 118 is formed in a plate shape, and covers the display module 165a and the input 164 in a closed state.

The body 110 includes a handle 113. The handle 113 may be disposed on a rear side of the case 112. The body 110 includes a battery inlet 114 for inserting or withdrawing a battery Bt therethrough. The battery inlet 114 may be disposed on a lower side of a frame 111. The battery inlet 114 may be disposed on a rear side of the frame 111.

The body 110 includes a power switch 115 for turning on and off the power of the mobile robot 100. The power switch 115 may be disposed on the lower side of the frame 111.

The body 110 includes a blade protector 116 that covers a lower side of a central portion of a blade 140. The blade protector 116 is provided to cover the central portion of the blade 140 while exposing a portion of the blade 140 in the centrifugal direction.

The body 110 includes a bumper 112b disposed at a front side thereof. The bumper 112b performs a function of absorbing an impact upon contact with an obstacle at an outside. The bumper 112b is provided at a front portion thereof with a bumper groove 112h which is recessed rearward while being elongated in the left and right direction. A plurality of the bumper grooves 112h may be disposed to be spaced apart in the vertical direction. A lower end of a protruding rib 111ba is disposed at a position lower than a lower end of an auxiliary rib 111bb.

The bumper 112b is formed by connecting the front side to the left and right sides thereof. The front side is connected to the left and right sides of the bumper 112b in a rounded shape.

The body 110 may include a bumper auxiliary part 112c disposed to surround the outer surface of the bumper 112b. The bumper auxiliary part 112c surrounds a lower portion of the front side of the bumper 112b and lower portions of the left and right sides of the bumper 112b. The bumper auxiliary part 112c may cover lower half portions of the front side and the left and right sides of the bumper 112b.

The front end of the bumper auxiliary part 112c is disposed in front of the front end of the bumper 112b. The bumper auxiliary part 112c forms a surface protruding from the surface of the bumper 112b. The bumper auxiliary part 112c may be formed of a material beneficial for shock absorbing, such as rubber. The bumper auxiliary part 112c may be formed of a flexible material.

The mobile robot 100 includes a driving wheel module 120 that moves the body 110 with respect to the ground (a travelling surface). The driving wheel module 120 includes a first wheel 120a and a second wheel 120b provided on the left side and the right side, respectively, to be independently rotatable. The mobile robot 100 includes a driving motor module 130 that provides rotational force to the driving wheel module 120. The drive motor module 130 includes a first motor 130a that provides rotational force of the first wheel 120a and a second motor 130b that provides rotational force of the second wheel 120b. The first motor 130a is disposed on the left side of the second motor 130b. The mobile robot 100 includes the blade 140 rotatably provided to mow the lawn. The mobile robot 100 includes a blade motor that provides rotational force of the blade 140. The mobile robot 100 includes a battery Bt that supplies power to the driving motor module 130. The battery Bt may supply power to the blade motor.

The mobile robot 100 includes a sensor 170 disposed in the inner space of the body 110. The sensor 170 includes a gyro sensing function and a magnetic field sensing function. The sensor 170 may further include an acceleration sensing function.

The mobile robot 100 includes an obstacle detector 161 that detects an obstacle in front of the mobile robot 100. A plurality of the obstacle detectors 161a, 161b, and 161c may be provided. The obstacle detector 161 is disposed on the front surface of the body 110. The obstacle detector 161 is disposed above the frame 111.

The mobile robot 100 may include a rain detector (not shown) that detects rain. The rain detector may be disposed on the case 112. The lane detector may be disposed above the frame 111.

The mobile robot 100 includes a remote signal receiver 101 that receives an external remote signal. When a remote signal is transmitted by an external remote controller, the remote signal receiver 101 may receive the remote signal. For example, the remote signal may be an infrared signal. The signal received by the remote signal receiver 101 may be processed by the controller 163 (at least one processor).

A plurality of the remote signal receivers 101 may be provided. The plurality of remote signal receivers 101 include a first remote signal receiver 101a disposed on the front side of the body 110 and a second remote signal receiver 101b disposed on the rear side of the body 110. The first remote signal receiver 101a receives a remote signal transmitted from the frontside. The second remote signal receiver 101b receives a remote signal transmitted from the rear side.

The mobile robot 100 includes an auxiliary wheel 162 disposed in front of the first wheel 120a and the second wheel 120b. The auxiliary wheel 162 may be disposed in front of the blade 140. The auxiliary wheel 162 is a wheel that does not receive a driving force from a motor, and serves to support the body 110 in an auxiliary manner with respect to the ground. Casters supporting a rotational axis of the auxiliary wheel 162 are coupled to the frame 111 so as to be rotatable about a vertical axis. A first auxiliary wheel 162a disposed on the left side and a second auxiliary wheel 162b disposed on the right side may be provided.

The mobile robot 100 is provided to change the height of the blade 140 relative to the ground, so that the height for lawn mowing may be changed. The mobile robot 100 includes the height adjustment part 166 for a user to change the height of the blade 140. The height adjustment part 166 includes a rotatable dial, and may change the height of the blade 140 based on the dial being rotated.

The mobile robot 100 includes the height display part 167 that displays the level of the height of the blade 140. When the height of the blade 140 is changed according to a manipulation of the height adjustment part 166, the height level displayed by the height display part 167 is accordingly changed. For example, the height display part 167 may display an expected height value of the lawn expected after the mobile robot 100 mows the lawn at the current height of the blade 140.

The mobile robot 100 includes a global positioning system (GPS) board 168 provided to detect a GPS signal. The GPS board 168 may be a printed circuit board (PCB).

The mobile robot 100 includes a docking insertion part 169 connected to a docking device when docked onto the docking device (not shown). The docking insertion part 169 is provided to be recessed so that a docking connection part (not shown) of the docking device is inserted into the docking insertion part 169. The docking insertion part 169 is disposed on the front side of the body 110. By the connection of the docking insertion part 169 and the docking connection part, an accurate position may be guided at a time of charging the mobile robot 100.

The mobile robot 100 may include a charging corresponding terminal 102 disposed at a position at which the charging corresponding terminal 102 contacts a charging terminal (not shown) with the docking insertion part 169 inserted into the docking connection part. The charging corresponding terminal 102 may include a pair of charging corresponding terminals 102a and 102b disposed at positions corresponding to a pair of charging terminals. The pair of charging corresponding terminals 102a and 102b may be disposed horizontally side by side with the docking insertion part 169 interposed therebetween.

A terminal cover (not shown) may be provided to cover the docking insertion part 169 and the pair of charging terminals so as to be openable and closeable. When the mobile robot 100 is traveling, the terminal cover may cover the docking insertion part 169 and the pair of charging terminals. When the mobile robot 100 is connected to the docking device, the terminal cover may be opened to expose the docking insertion part 169 and the pair of charging terminals.

Referring to FIG. 5, the mobile robot 100 according to the embodiment may include a controller 163 collectively controlling the operation of the mobile robot 100, an input 164 receiving a control command related to the mobile robot 100 from a user, an output 165 outputting information related to the operation of the mobile robot 100, a tag 175 receiving a signal from a beacon 300 installed outside, a vision sensor 177 acquiring image information on a traveling path of the mobile robot 100, a communicator 180 (e.g., a transceiver) communicating with an external device, such as a user terminal 200, and a memory 190 storing information related to the operation of the mobile robot 100.

The mobile robot 100 may include the controller 163 that controls autonomous driving. The controller 163 collectively controls the operation of the mobile robot 100. In addition, the controller 163 may process a signal from the obstacle detector 161 and may process a signal from the GPS board 168. The controller 163 may process a signal from the input 164.

The controller 163 may control driving of the first motor 130a and the second motor 130b. The controller 163 may control driving of the blade motor. The controller 163 may control the output of the output 165.

The controller 163 includes a main board 163 disposed in the inner space of the body 110. The main board 163 refers to a printed circuit board (PCB).

The mobile robot 100 may include the input 164 capable of inputting various instructions from a user. The input 164 may include a button, a dial, a touch display, or the like. The input 164 may include a microphone (not shown) for speech recognition. In this embodiment, a plurality of buttons are disposed on the upper side of the case 112.

The mobile robot 100 may include the output 165 that outputs various pieces of information related to the operation of the mobile robot 100 to a user. The output 165 may include a display module 165a that outputs visual information. The output 165 may include an alert 165b that outputs auditory information.

As will be described below, the display module 165a and the alert 165b may display a warning message or emit a warning sound about a travel incapability situation of the mobile robot 100.

In one embodiment, the display module 165a outputs an image in an upward direction. The display module 165a is disposed on the upper side of the case 112. For example, the display module 165a may include a thin film transistor liquid crystal display (TFT-LCD) panel. In addition, the display module 165a may be implemented using various display panels, such as a plasma display panel or an organic light emitting diode display panel.

The mobile robot 100 may include the tag 175 that receives a signal from the beacon 300 installed outside. The signal of the beacon 300 received by the tag 175 may be an ultra-wideband (UWB) signal, and the signal transmitted from the beacon 300 to the tag 175 may include position information of the beacon 300.

The position and number of the tags 175 provided in the mobile robot 100 are not limited, and the tag 175 may be implemented as a device including at least one of a Near Field Communication (NFC) module and a Radio Frequency Identification (RFID) reader, capable of receiving or reading signals in a short distance.

The mobile robot 100 may include the vision sensor 177 that acquires image information about a travelling path of the mobile robot 100. As will be described below, the vision sensor 177 may distinguish and recognize a lawn area and a non-lawn area on the traveling path of the mobile robot 100, and obtain position information of a boundary line between the lawn area and the non-lawn area.

The vision sensor 177 may acquire surrounding image information by capturing an image of the surroundings of the mobile robot 100 on the travelling path of the mobile robot 100. In addition, the vision sensor 177 may obtain position information of a path or area on which the mobile robot 100 is traveling.

The vision sensor 177 may include an RGB camera capable of detecting a shape or color of an object according to an embodiment. In addition, the vision sensor 177 may be an RGB-D camera capable of detecting a shape, color, and distance of an object according to an embodiment.

The mobile robot 100 may include the communicator 180 for communicating with an external device (a terminal, etc.), a server, and a router. The communicator may be varied according to a communication method of another device or server desired to communicate with the mobile robot 100.

The communicator 180 may be implemented using a communication chip, an antenna, and related components to access at least one of a wired communication network or a wireless communication network. That is, the communicator 180 may be implemented as various types of communication modules capable of short-range communication or long-range communication with the user terminal 200.

The memory 190 may store a control program and control data for controlling the mobile robot 100, or store a control command input through the input 164, position coordinate information of the mobile robot 100 determined based on position information of the beacon 300, position coordinate information of the boundary line of the lawn area obtained by the vision sensor 177 during travel of the mobile robot 100.

In addition, the memory 190 may store position information of the beacon 300 installed outside. That is, the user may input information about the position coordinates of the beacon 300 installed in a moving area of the mobile robot 100 into the mobile robot 100 through the input 164, and the input position coordinate data may be stored in the memory 190.

The position coordinates of the beacon 300 stored in the memory 190 may be determined according to an arbitrary reference point, and among a plurality of beacons, the position coordinates of other beacons may be determined based on the position coordinates of a reference beacon.

In addition, the memory 190 includes a volatile memory (not shown), such as Static Random Access Memory (S-RAM) and a Dynamic Random Access Memory (D-RAM), and a Non-volatile memory (not shown), such as flash memory, Read Only Memory (ROM), an Erasable Programmable Read Only Memory (EPROM), an Electrically Erasable Programmable Read Only Memory (EEPROM), and the like.

The nonvolatile memory may operate as an auxiliary memory device of the volatile memory, and may store a control program and control data for controlling the operation of the mobile robot 100. In addition, the nonvolatile memory may retain the stored data even when the power of the mobile robot 100 is cut off, and the volatile memory may temporarily store the control program and control data loaded from the nonvolatile memory, or temporarily store the control command input through the input 164. Unlike the nonvolatile memory, the volatile memory may lose stored data when power of the mobile robot 100 is cut off.

Figure 6:
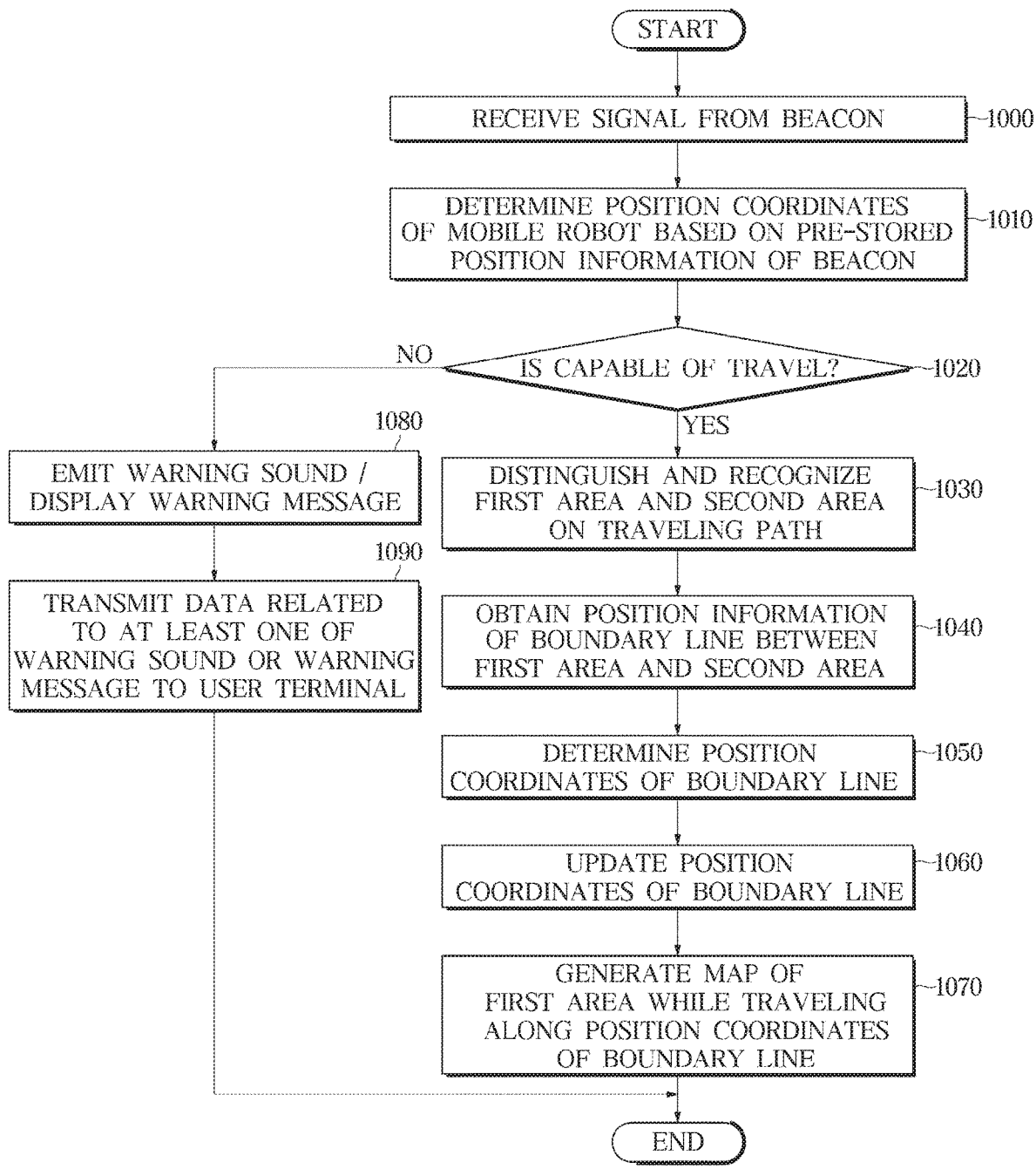
FIG. 6 is a flowchart showing a method of controlling a mobile robot according to an embodiment of the disclosure.
Figure 7:
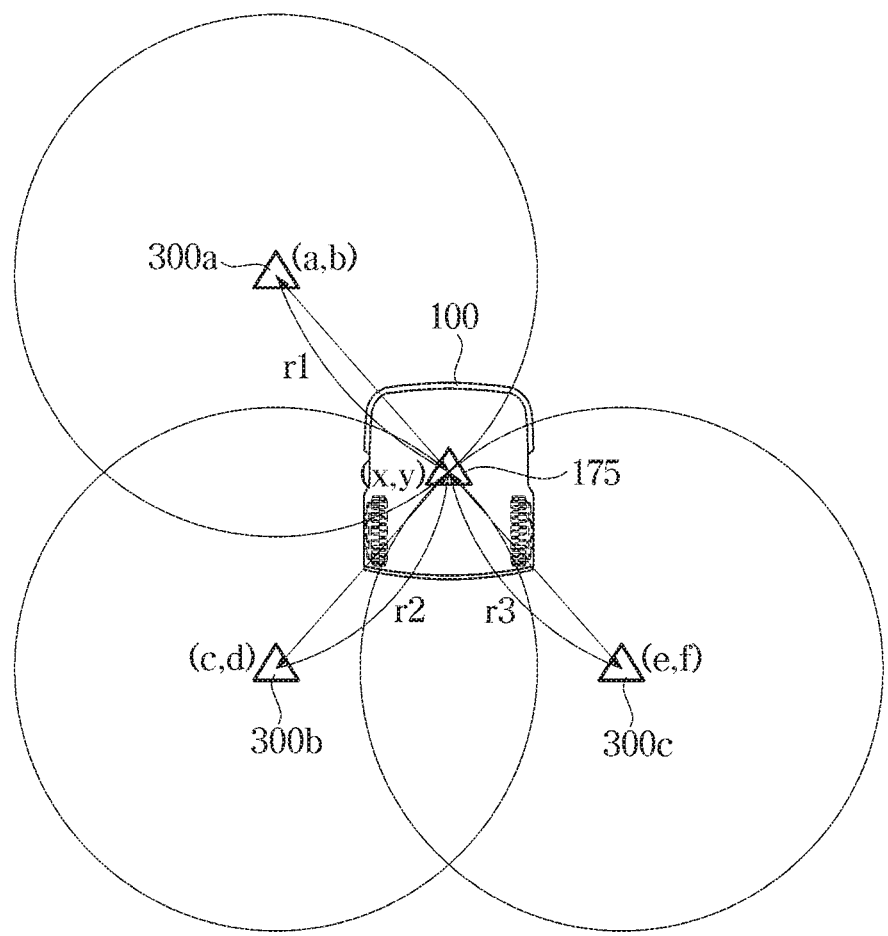
FIGS. 7 and 8 are conceptual diagrams illustrating determination of position coordinates of a mobile robot according to an embodiment of the disclosure.
Figure 8:
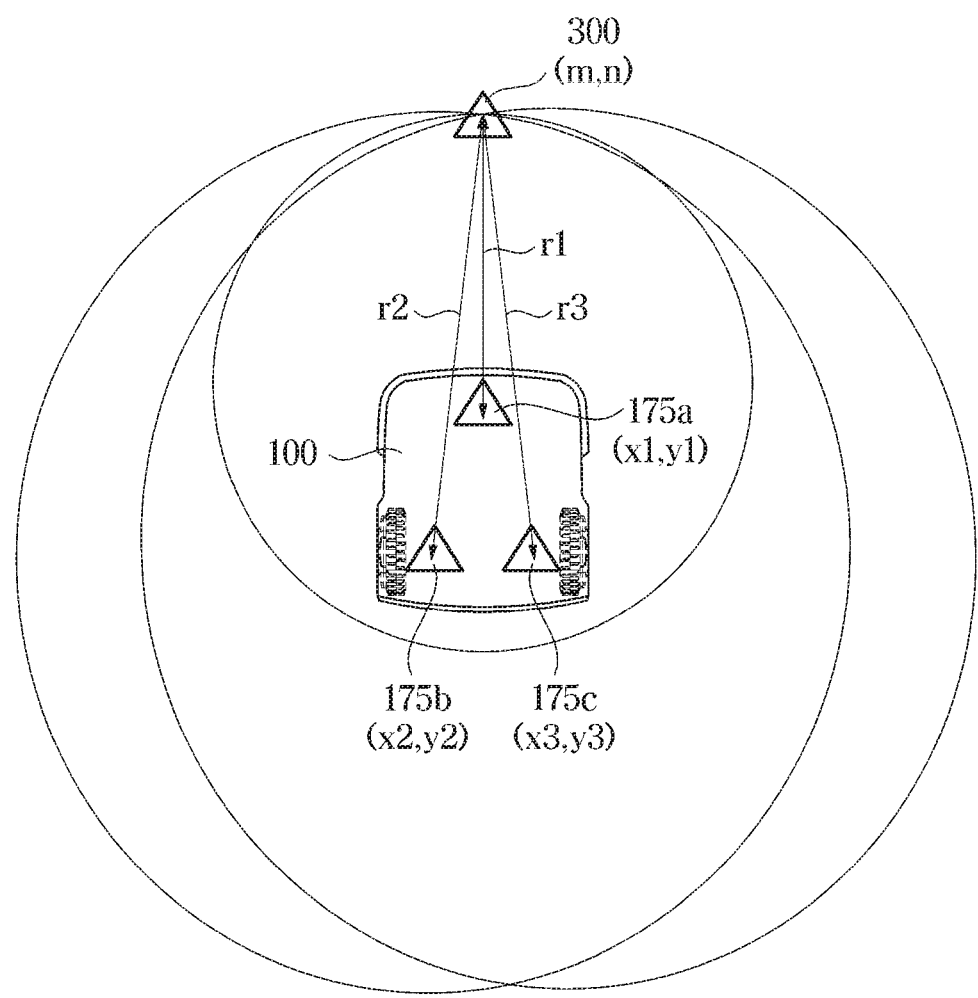
Figure 9:
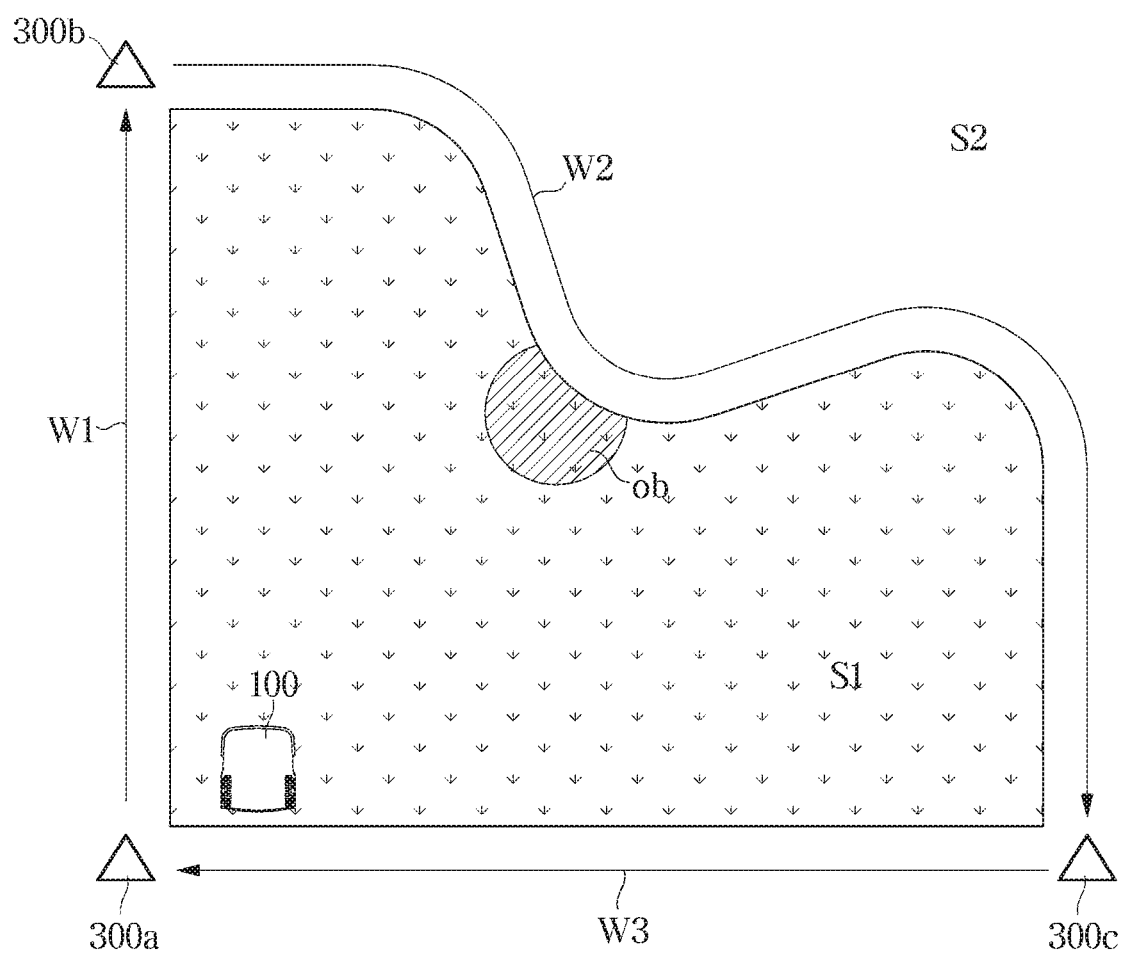
FIG. 9 is a diagram illustrating a work area of a mobile robot according to an embodiment of the disclosure.
Figure 10:
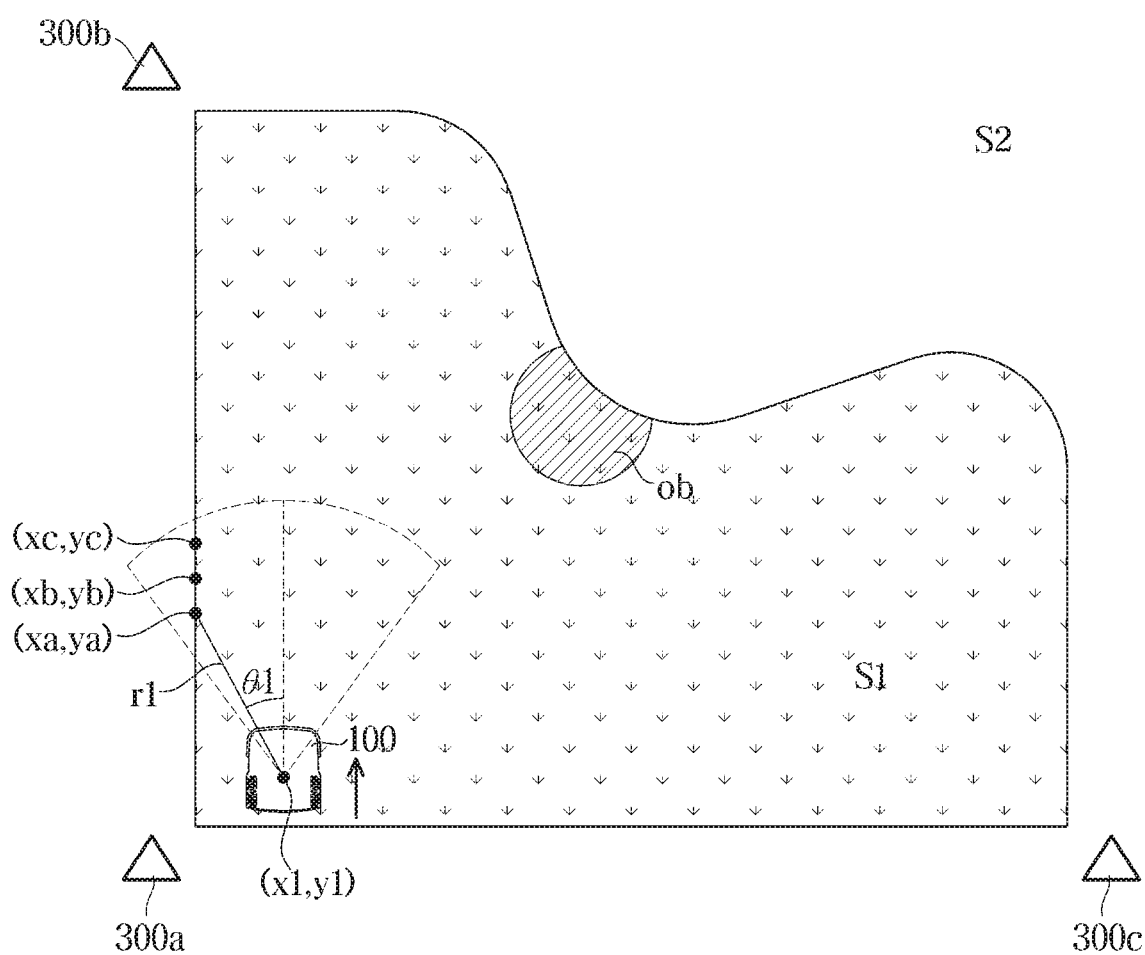
FIG. 10 is a view illustrating determination of position coordinates of a boundary line between a lawn area and a non-lawn area according to an embodiment of the disclosure.
Figure 11:
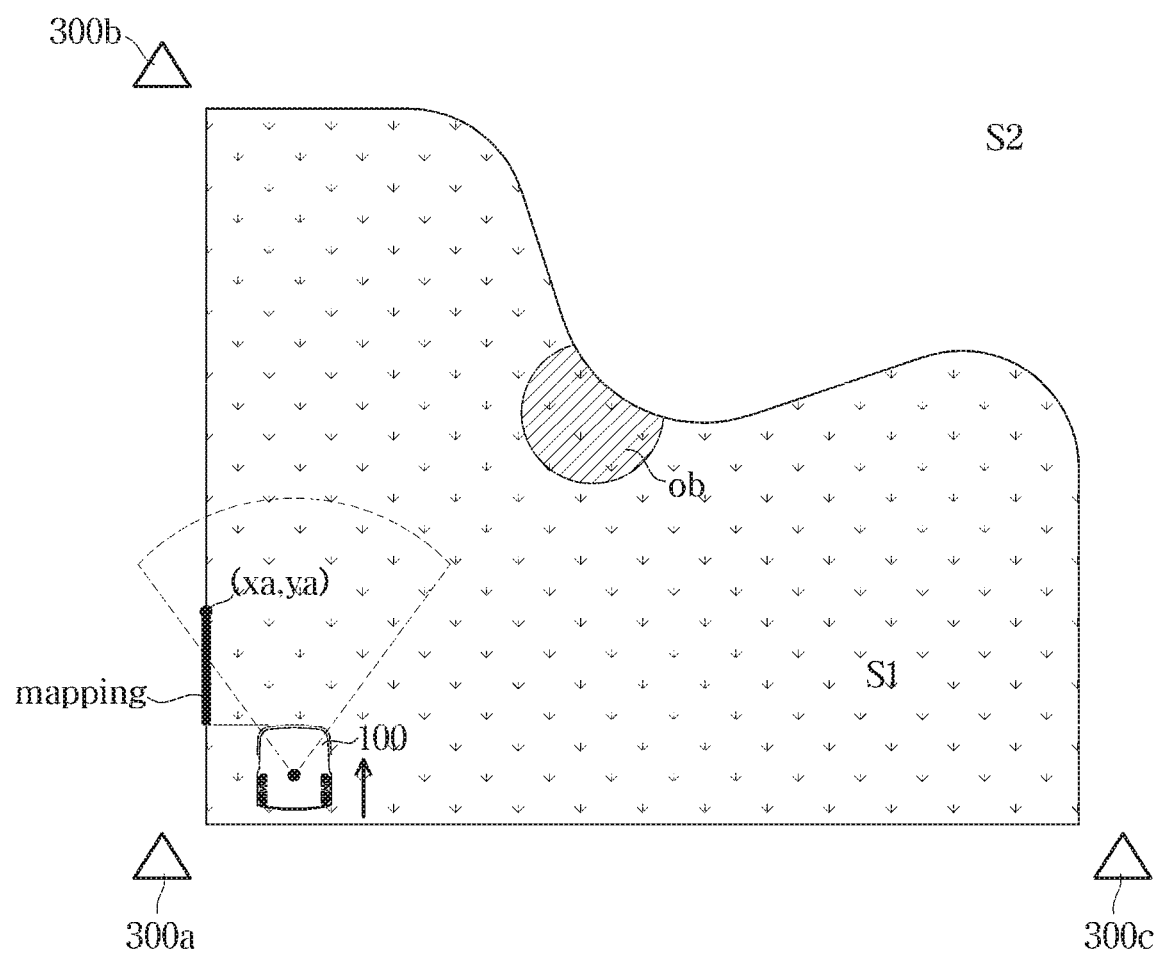
FIG. 11 is a view illustrates update of the position coordinates of the boundary line determined in FIG. 10 according to an embodiment of the disclosure.
Figure 12:
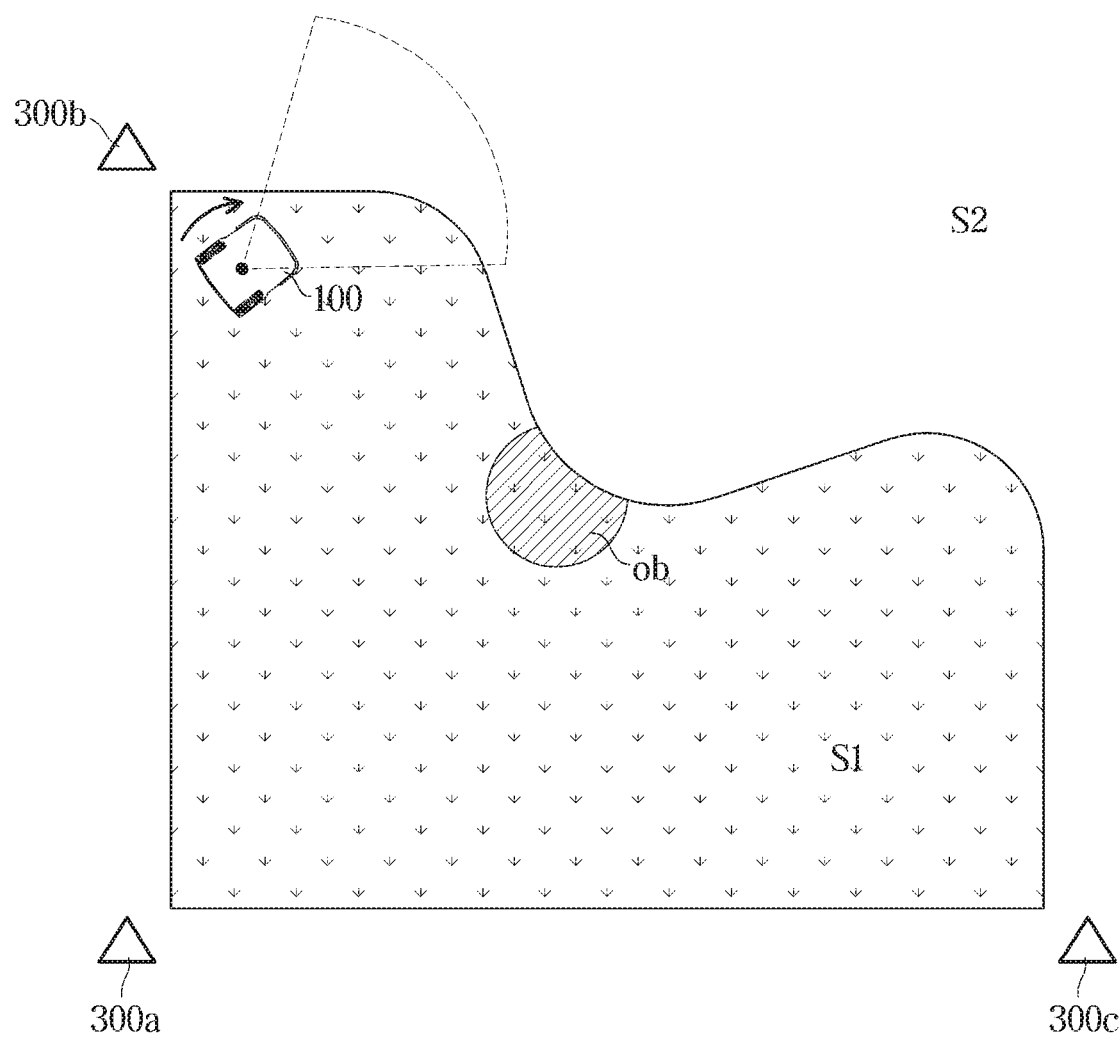
FIG. 12 is a view illustrating rotation of the mobile robot near a beacon according to an embodiment of the disclosure.
Figure 13:
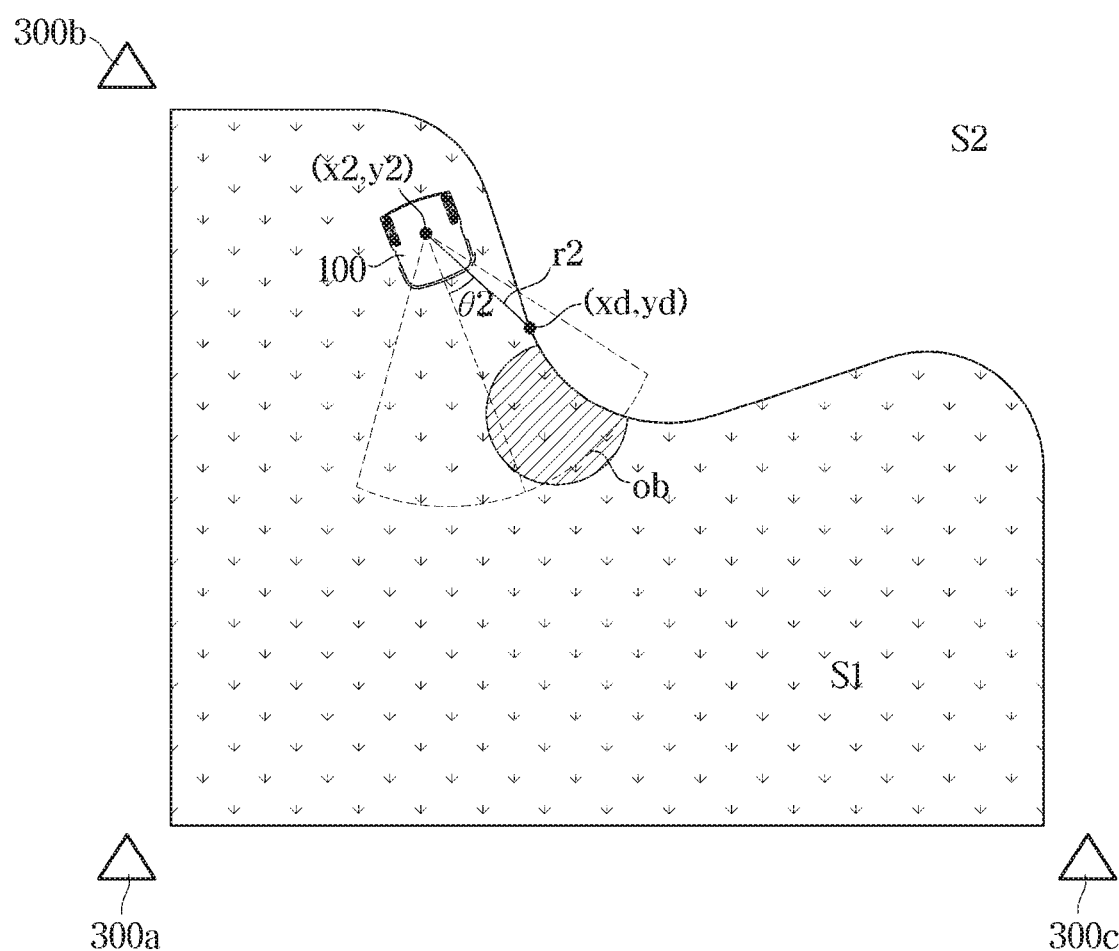
FIG. 13 is a view illustrating determination of position coordinates of a boundary line between a lawn area and a non-lawn area according to an embodiment of the disclosure.
Figure 14:
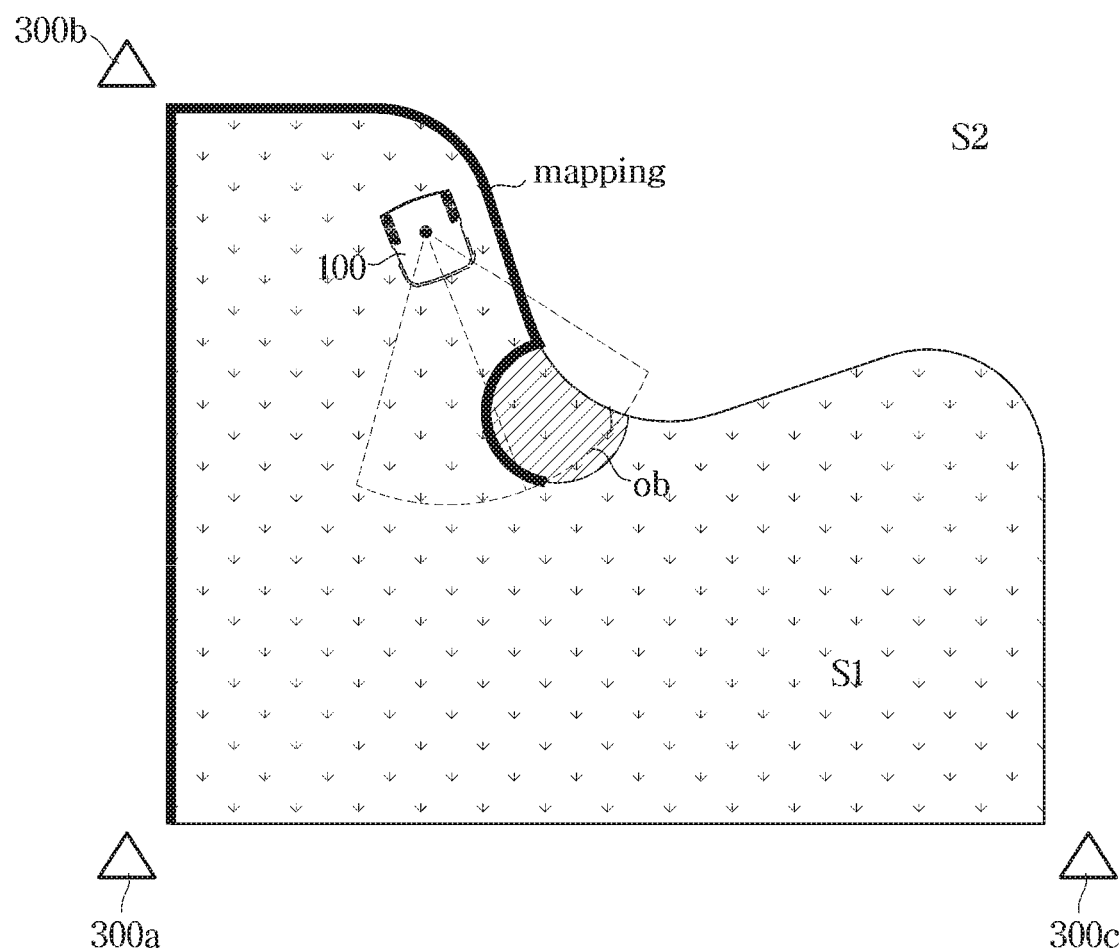
FIG. 14 is a view illustrating update of position coordinates of a boundary line on a travelling path in which a mobile robot has moved according to an embodiment of the disclosure.
Figure 15:
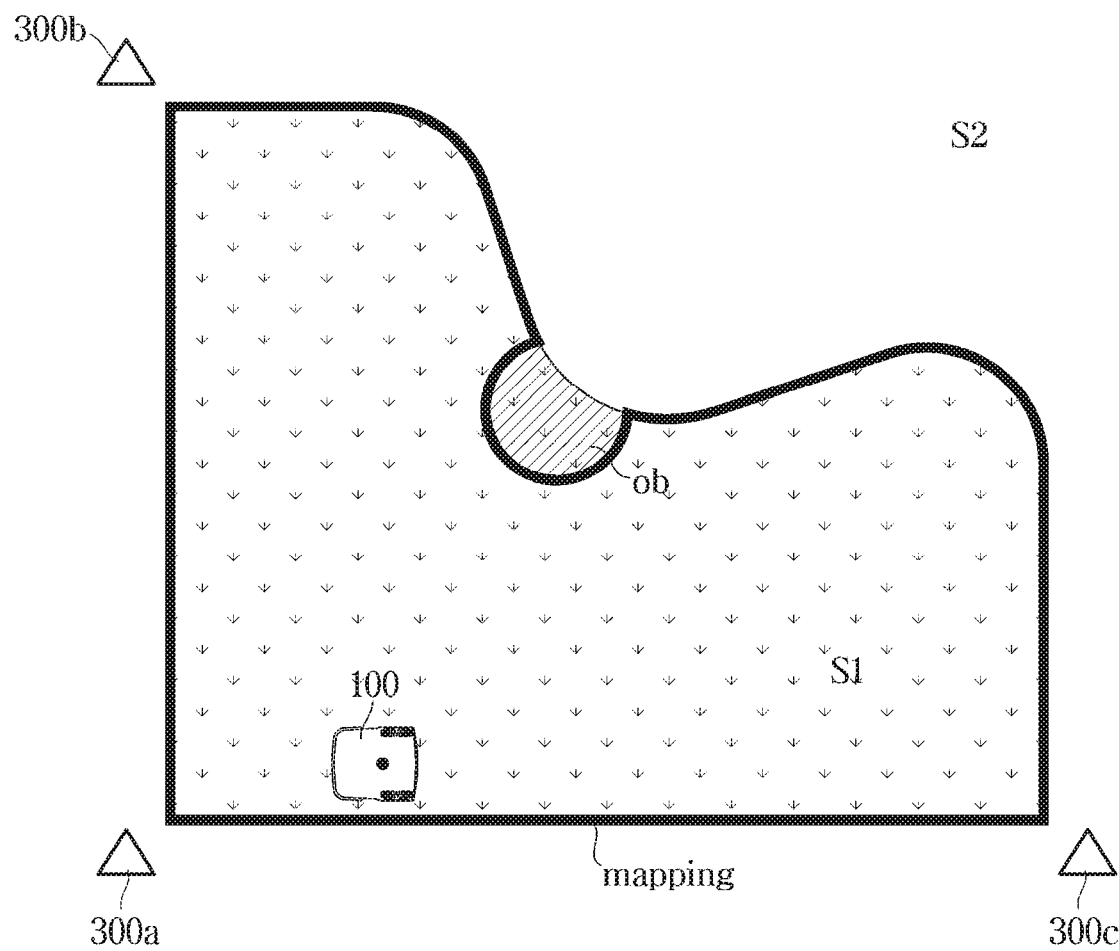
FIG. 15 is a view illustrating a map for a working area of a mobile robot generated according to an embodiment of the disclosure.

FIG. 6 is a flowchart showing a method of controlling a mobile robot according to an embodiment of the disclosure. FIGS. 7 and 8 are conceptual diagrams illustrating determination of position coordinates of a mobile robot according to various embodiments of the disclosure. FIG. 9 is a diagram illustrating a work area of a mobile robot according to an embodiment of the disclosure. FIG. 10 is a view illustrating determination of position coordinates of a boundary line between a lawn area and a non-lawn area according to an embodiment of the disclosure. FIG. 11 is a view illustrates update of the position coordinates of the boundary line determined in FIG. 10 according to an embodiment of the disclosure. FIG. 12 is a view illustrating rotation of the mobile robot near a beacon according to an embodiment of the disclosure. FIG. 13 is a view illustrating determination of position coordinates of a boundary line between a lawn area and a non-lawn area according to an embodiment of the disclosure. FIG. 14 is a view illustrating update of position coordinates of a boundary line on a travelling path in which a mobile robot has moved according to an embodiment of the disclosure. FIG. 15 is a view illustrating a map for a working area of a mobile robot generated according to an embodiment of the disclosure.

Referring to FIG. 6, the tag 175 provided on the mobile robot 100 may receive a signal from the beacon 300 installed outside (operation 1000). As described above, the signal transmitted from the beacon 300 to the tag 175 may include position information of the beacon 300, but in general, the tag 175 may only receive an identification signal related to the position of the beacon 300 from the beacon 300.

The beacon 300 may be provided at an arbitrary position in a space where the mobile robot 100 moves, and when the tag 175 receives signals from three or more beacons 300, the mobile robot 100 may identify the current position thereof through the position information of the beacon 300 pre-stored in the memory 190.

In addition, the mobile robot 100 may identify the current position thereof using the principle of GPS through the position information of the beacons 300 transmitted from the three or more beacons 300 to the tag 175.

In addition, a method of the mobile robot 100 determining the n position thereof may be implemented by installing a plurality of ultrasonic wave portions on a charging part of the mobile robot 100 and calculating the arrival time of ultrasonic signals oscillated from the charging part based on RF signals emitted from the mobile robot 100 at a predetermined time interval to detect the distance and angle of the charging part with respect to the mobile robot 100.

When receiving a signal from the beacon 300, the controller 163 may determine the position coordinates of the mobile robot 100 based on the position information of the beacon 300 pre-stored in the memory 190 (operation 1010).

That is, as described above, the position coordinates of the beacon 300 are input from the user and stored in the memory 190, and the controller 163 uses the information stored in the memory 190 to determine the position coordinates of the mobile robot 100.

Referring to FIG. 7, a first beacon 300a, a second beacon 300b, and a third beacon 300c may be provided at arbitrary positions in a space in which the mobile robot 100 moves, and the controller 163 may determine the position coordinates of the mobile robot 100 through triangulation between each of the first beacon 300a, the second beacon 300b, and the third beacon 300c and the tag 175 provided on the mobile robot 100.

In the embodiment of FIG. 7, one tag 175 is provided on the mobile robot 100 and three or more beacons 300 are installed.

The memory 190 of the mobile robot 100 stores data on the position coordinates of the first to third beacons 300a to 300c, and the tag 175 may respectively receive signals from the first to third beacons 300a to 300c.

As shown in FIG. 7, when the tag 175 provided on the mobile robot 100 has position coordinates (x, y), and the first beacon 300a has position coordinates (a, b), the second beacon 300b has position coordinates (c, d), and the third beacon 300c has position coordinates (e, f), and the distances between each of the first beacon 300a, the second beacon 300b, and the third beacon 300c and the mobile robot 100 are denoted as r1, r2 and r3, respectively, the position coordinates (x, y) of the tag 175 provided on the mobile robot 100 may be determined according to Equations 1 to 3. The position coordinates of the tag 175 correspond to the position coordinates of the mobile robot 100.

$$(x-a)^2+(y-b)^2=r1^2 \qquad \text{Equation 1}$$

$$(x-c)^2+(y-d)^2=r2^2 \qquad \text{Equation 2}$$

$$(x-e)^2+(y-f)^2=r3^3 \qquad \text{Equation 3}$$

In this case, the method of determining the distances r1 to r3 between each of the first beacon 300a to the third beacon 300c and the tag 175 includes transmitting, by the beacon 300, a UWB pulse having a specific strength (voltage) to the tag 175 of the mobile robot 100, and receiving, by the tag 175, a slightly distorted signal of the UWB pulse after a certain time T has elapsed. In this case, the tag 175 and the beacon 300 have a synchronized timer, and when the tag 175 transmits a UWB signal at a predetermined time, and the beacon 300 receives the signal when a time T passes after the predetermined time, the controller 163 may calculate the distance between the tag 175 and the beacon 300 by multiplying the time T by the speed of the radio wave (300,000 km/s).

In addition, the controller 163 may determine the distances r1 to r3 between each of the first beacon 300a to the third beacon 300c, and the mobile robot 100 based on the strength of the signal received by the tag 175 from each of the first beacon 300a, the second beacon 300b, and the third beacon 300c.

Signals used to determine the position between the beacon 300 and the mobile robot 100 may include signals such as infrared and Radio Frequency (RF) in addition to the UWB signal, but are not limited thereto.

Referring to FIG. 8, unlike in FIG. 7, one beacon 300 is provided at an arbitrary position where the mobile robot 100 moves, and the controller 163 may determine position coordinates of the mobile robot 100 through triangulation between the beacon 300 and each of a first tag 175a, a second tag 175b, and a third tag 175c provided on the mobile robot 100.

In the embodiment of FIG. 8, three or more tags 175 are provided on the mobile robot 100, and one beacon 300 is installed.

The memory 190 of the mobile robot 100 stores data on the position coordinates of the beacon 300, and each of the first tag 175a to the third tag 175c may receive a signal from the beacon 300.

As shown in FIG. 8, when the first tag 175a provided on the mobile robot 100 has position coordinates (x1, y1), the second tag 175b has position coordinates (x2, y2), and the third tag 175c has position coordinates (x3, y3), the beacon 300 has position coordinates (m, n), and the distances between each of the first tag 175a to the third tag 175c and the beacon 300 are denoted as r1, r2, and r3, and the position coordinates of the first tag 175a to the third tag 175c provided on the mobile robot 100 may be determined according to Equations 4 to 6 and the positional relationship between the first tag 175a to third tag 175c.

$$(x1-m)^2+(y1-n)^2=r1^2 \quad \text{Equation 4}$$

$$(x2-m)^2+(y2-n)^2=r2^2 \quad \text{Equation 5}$$

$$(x3-m)^2+(y3-n)^2=r3^2 \quad \text{Equation 6}$$

In this case, the method of determining the distances r1 to r3 between each of the first tag 175a to the third tag 175c and the beacon 300 is the same as the method described above.

Upon determining the position coordinates of the mobile robot 100, the controller 163 may determine whether the mobile robot 100 is capable of travelling at the current position (operation 1020). That is, the mobile robot 100 may travel based on the beacon 300 provided in a work area, as shown in FIG. 9.

When the first beacon 300a to the third beacon 300c are provided in the work area, the mobile robot 100 may set a boundary of the work area while travelling along a first travelling path W1 from the first beacon 300a to the second beacon 300b. In addition, the mobile robot 100 may set a boundary of the work area while travelling along a second travelling path W2 from the second beacon 300ba to the third beacon 300c. Similarly, the mobile robot 100 may set a boundary of the work area while travelling along a third travelling path W3 from the third beacon 300c to the first beacon 300a.

In the disclosed embodiment, it is assumed that the working area of the mobile robot 100 is a lawn area. That is, referring to FIG. 9, a lawn area for the mobile robot 100 to perform a task may be defined as a first area S1, and an area excluding the lawn area may be defined as a second area S2.

With the mobile robot 100 and the control method thereof according to the disclosed embodiment, the mobile robot 100 may generate a map for the first area S1, that is, the lawn area, while travelling along the boundary between the first area S1 and the second area S2.

The vision sensor 177 distinguishes and recognizes the first area S1 and the second area S2 on the traveling path of the mobile robot 100 (operation 1030) and obtains position information of a boundary line between the first area S1 and the second area S2 (operation 1040).

As illustrated in FIG. 10, the vision sensor 177 may acquire surrounding image information by photographing the surroundings of the mobile robot 100 on the travelling path of the mobile robot 100. The vision sensor 177 may distinguish and recognize the lawn area and the non-lawn area, and obtain position information of a boundary line between the lawn area and the non-lawn area.

The vision sensor 177 detects the shape or color of the lawn based on the data stored in the memory 190 to distinguish the first area S1, which is a lawn area, and the second area S2, which is a non-lawn area.

The controller 163 may determine the position coordinates of the boundary line based on the position coordinates of the mobile robot 100 and the position information of the boundary line acquired by the vision sensor 177 (operation 1050).

Referring to FIG. 10, when the mobile robot 100 is determined to have position coordinates x1, y1 according to the method of Equations 1 to 3 at the current position of the mobile robot 100), the controller 163 may determine the position coordinates of the boundary line as coordinates (xa, ya) based on the distance and angle of the boundary line between the first area S1 and the second area S2 with respect to the mobile robot 100, which are obtained by the vision sensor 177.

That is, when the distance of the boundary line between the first area S1 and the second area S2 is r1 and the angle of the boundary line is $\theta_1$ with respect to the position coordinates (x1, y1) of the mobile robot 100, the position coordinates of the boundary line may be determined as coordinates (xa, ya) according to Equation 7 and Equation 8.

$$x_a = x_1 - r_1 \sin \theta^1 \quad \text{Equation 7}$$

$$y_a = y_1 + r_1 \cos \theta_1 \quad \text{Equation 8}$$

Referring to FIG. 11, the controller 163 determines the position coordinates of the boundary line between the first area S1 and the second area S2 on the travelling path of the mobile robot 100, and map the determined position coordinates of the boundary line, thereby generating a map of the first area S1 up to the position coordinates of the boundary line.

In addition, when the mobile robot 100 travels, the position coordinates of the mobile robot 100 are changed, and the position coordinates of the boundary line between the first area S1 and the second area S2 acquired by the vision sensor 177 are also changed to (xb, yb) or (xc, yc).

That is, the controller 163 may determine the position coordinates of the boundary line between the first area S1 and the second area S2 acquired by the vision sensor 177 in real time, on the basis of the position coordinates of the mobile robot 100 that are changed in real time as the mobile robot 100 travels, and may update the determined position coordinates of the boundary line (operation 1060), thereby generating the map of the first area S (operation 1070).

Referring to FIG. 12, as described above, the mobile robot 100 may travel between two beacons 300 installed in advance, and when located within a predetermined distance from the beacon 300, distinguish and recognize the first area S1 and the second area S2 while rotating at a predetermined angle, and acquire the position information of the boundary line between the first area S1 and the second area S2 while travelling along the boundary line between the first area S1 and the second area S2.

That is, when the mobile robot 100 travels along the first travelling path W1 from the first beacon 300a to reach the second beacon 300b, a straight travelling path passing through the second beacon 300b does not exist further, and thus the mobile robot 100 needs to set a travelling path toward the third beacon 300c. That is, when the mobile robot 100 approaches the second beacon 300b to enter an area within a certain distance of the second beacon 300b, the mobile robot 100 may rotate in the vicinity of the second beacon 300b and search the surroundings.

In this case, the mobile robot 100, while rotating at a predetermined angle in the vicinity of the second beacon 300b, may search for a travelling path in which the mobile robot 100 is able to travel as shown in FIG. 12, and may distinguish and recognize the first area S1 and the second area S2 through image information acquired by the vision sensor 177.

Referring to FIG. 13, the mobile robot 100, while travelling from the second beacon 300b to the third beacon 300c along the second travelling path W2, may distinguish and recognize the lawn area and the non-lawn area by the vision sensor 177, and acquire position information of a boundary line between the lawn area and the non-lawn area.

The controller 163 may determine the position coordinates of the boundary line between the first area S1 and the second area S2, based on the position coordinates of the mobile robot 100 and the position information of the boundary line between the first area S1 and the second area S2 obtained by the vision sensor 177 (operation 1050).

Referring to FIG. 13, when the mobile robot 100 travelling on the second travelling path W2 has position coordinates (x2, y2) at the current position, the controller 163 may determine position coordinates of the boundary line between the first area S1 and the second area S2 as coordinates (xd, yd), based on the distance and angle of the boundary line between the first area S1 and the second area S2 with respect to the mobile robot 100, which are obtained by the vision sensor 177.

That is, when the distance of the boundary line between the first area S and the second area S2 with respect to the position coordinates (x2, y2) of the mobile robot 100 is r2, and the angle of the boundary line with respect to the position coordinates (x2, y2) of the mobile robot 100 is $\theta_1$, the position coordinates of the boundary line may be determined as coordinates (xd, yd) according to Equations 9 and 10.

$$x_d = x_2 - r_2 \sin \theta_2 \quad \text{Equation 9}$$

$$y_d = y_2 + r_2 \cos \theta_2 \quad \text{Equation 10}$$

In addition, as shown in FIG. 13, when an obstacle ob is located on the traveling path of the mobile robot 100, the vision sensor 177 distinguishes and recognizes a lawn area and an obstacle ob area, and obtain position information of a boundary line between the lawn area and the obstacle ob area.

In the same manner as described above, the controller 163 may determine the position coordinates of the boundary line between the lawn area and the obstacle ob area, based on position coordinates of the mobile robot 100 and position information of the boundary line between the lawn area and the obstacle ob area acquired by the vision sensor (operation 1050).

Referring to FIG. 14, the controller 163 may determine the position coordinates of boundary lines between the first area S1, the second area S2, and the obstacle ob are on the second travelling path W2 of the mobile robot 100, and map the determined position coordinates, thereby generating a map of the first area S1 up to the position coordinates of each boundary line.

In addition, the controller 163 may determine the position coordinates of the boundary lines between the first area S1, the second area S2, and the obstacle ob area acquired by the vision sensor 177 in real time, on the basis of the position coordinates of the mobile robot 100 that are changed in real time as the mobile robot 100 travels, and update the determined position coordinates of the boundary lines (operation 1060), thereby generating the map of the first area S1, that is, the lawn area (operation 1070).

Referring to FIG. 15, it is a view illustrating the map for the working area of the mobile robot 100 generated according to the embodiment. That is, the mobile robot 100, while travelling from the first beacon 300a through the second beacon 300b and the third beacon 300c along the position coordinates of the boundary line and returning to the first beacon 300a, may update boundary information between the lawn area and the non-lawn area and generate a map for the lawn area, based on the control method of the mobile robot 100 described with reference to FIGS. 6 to 14.

Figure 16:
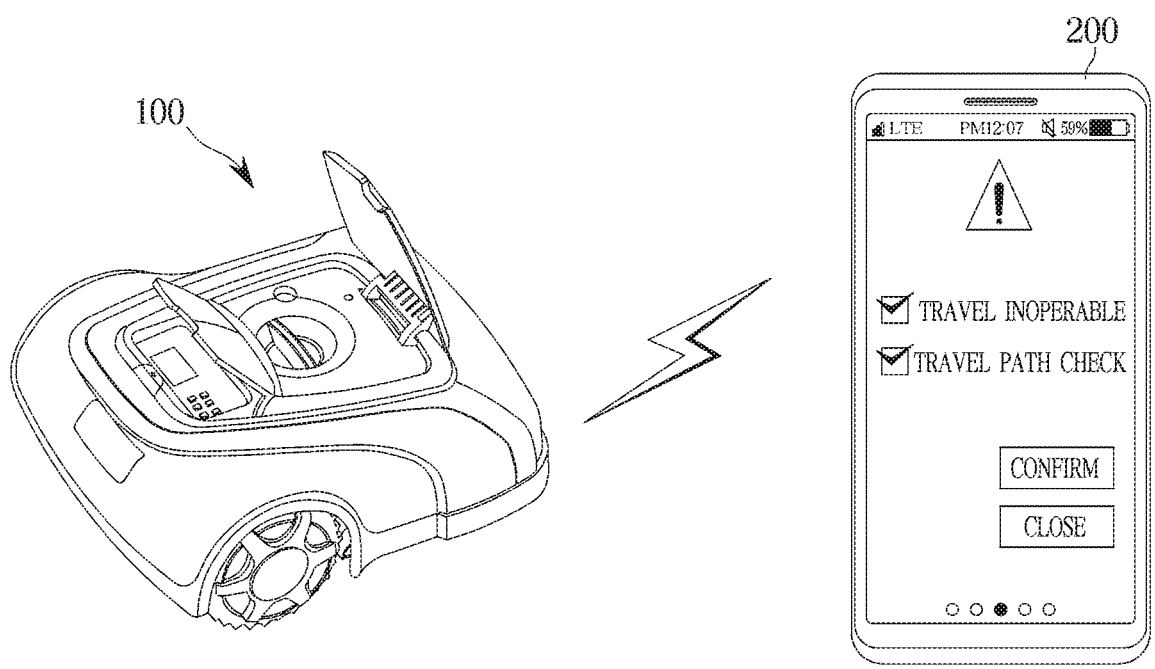
FIG. 16 is a view illustrating a warning message for a driving inoperability situation of a mobile robot displayed on a user terminal according to an embodiment of the disclosure.

On the other hand, referring to FIGS. 6 and 16, upon determination that the mobile robot is in a travel incapability situation, the controller 163 may emit a warning sound regarding the travel incapability situation through the alert 165b or display a warning message regarding the travel incapability situation through the display module 165a (1080).

That is, the controller 163, in a case in which an obstacle is located on the travelling path of the mobile robot 100 and thus further travelling is not performable, or a lawn area and a non-lawn area is not distinguishable and recognizable on the travelling path of the mobile robot 100 due to external factors, may control the alert 165b to emit a warning sound.

The alert 165b may be implemented in the form of a speaker that outputs a speech or an acoustic signal, and may output a warning message regarding a travelling incapability situation of the mobile robot 100 as a predetermined acoustic signal, such as a speech or a warning sound.

Similarly, the controller 163, in a case in which an obstacle is located on the travelling path of the mobile robot 100 and thus further travelling is not performable, or a lawn area and a non-lawn area is not distinguishable and recognizable on the travelling path of the mobile robot 100 due to external factors, may control the display module 165a to display a warning message.

The user may identify that the mobile robot 100 is currently in a travelling incapability situation or is unable to recognize the work area through a message displayed on the display module 165a of the mobile robot 100.

In addition, the controller 163 may control the communicator 180 to transmit to the user terminal 200 data related to at least one of a warning sound or a warning message indicating that an obstacle is located on the travelling path of the mobile robot 100 and thus further travelling is not performable, or that a lawn area and a non-lawn area is not distinguishable and recognizable on the travelling path of the mobile robot 100 due to external factors (1090).

The communicator 180 may communicate with the user terminal 200 capable of communicating with the mobile robot 100. The user terminal 200 may be implemented in various types as long as it can communicate with the mobile robot 100, for example, a smartphone, a person computer (PC), a tablet PC, and a mobile robot dedicated device provided to control the mobile robot 100 or check a state of the mobile robot 100.

The communicator 180 may be implemented using a communication chip, an antenna, and related components to access at least one of a wired communication network and a wireless communication network. That is, the communicator 180 may be implemented as various types of communication modules capable of short-range communication or long-range communication with the user terminal 200.

Based on the data received from the mobile robot 100 through the communicator 180, the user terminal 200 may output a predetermined acoustic signal, such as a speech or a warning sound, regarding occurrence of a constraint, such as a travelling incapability situation of the mobile robot 100.

FIG. 16 is a view illustrating a warning message for a driving inoperability situation of a mobile robot displayed on a user terminal according to an embodiment of the disclosure.

Referring to FIG. 16, the user terminal 200 may display a warning message regarding a case in which an obstacle is located on the travelling path of the mobile robot 100 and thus further travelling is not performable, or a lawn area and a non-lawn area is not distinguishable and recognizable on the travelling path of the mobile robot 100 due to external factors.

The user may identify that the mobile robot 100 is currently in a travelling inoperability situation or is unable to recognize the work area through the message displayed on the user terminal 200.

As described above, with the mobile robot and the control method thereof according to the embodiment of the disclosed, a lawnmower robot automatically generates a map of the lawn work area using a signal received from the beacon 300 and boundary position information of the lawn obtained through the vision sensor 177, so that the accuracy of generating the map of the lawn work area is increased and the user convenience is improved. In addition, since the map of the lawn working area is accurately generated, the amount of mowing work and the required time for mowing work may be accurately calculated, and the amount of battery required to perform the work of the lawnmower robot may be accurately predicted Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the lawnmower robot automatically generates a map of a lawn working area using a signal received from a beacon and position information of a boundary line of a lawn obtained through a vision sensor, so that the accuracy in generating a map of a lawn working area may be increased, and the user convenience may be improved. In addition, the amount of mowing work and the required time for mowing work may be accurately calculated, and the amount of battery required to perform the work of the lawnmower robot may accurately predicted.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile robot comprising:
one or more tags configured to receive a signal from one or more beacons;
a vision sensor configured to:
distinguish and recognize a first area and a second area on a travelling path of the mobile robot, and
acquire position information of a boundary line between the first area and the second area; and
at least one processor configured to:
determine position coordinates of the mobile robot based on pre-stored position information of the one or more beacons,
determine position coordinates of the boundary line based on the determined position coordinates of the mobile robot and the acquired position information of the boundary line, and
generate a map of the first area while travelling along the determined position coordinates of the boundary line,
wherein the at least one processor is further configured to determine the position coordinates of the boundary line based on a distance to the boundary line and an angle of the boundary line with respect to the determined position coordinates of the mobile robot.

2. The mobile robot of claim 1,
wherein the one or more tags is further configured to receive signals from the one or more beacons, which includes three or more beacons, and
wherein the at least one processor is further configured to determine the position coordinates of the mobile robot based on distances between each of the three or more beacons and the one or more tags.

3. The mobile robot of claim 1,
wherein the one or more tags comprises three or more tags,
wherein each of the three or more tags receives the signal from the one or more beacons, and
wherein the at least one processor is further configured to determine the position coordinates of the mobile robot based on distances between each of the three or more tags and the one or more beacons.

4. The mobile robot of claim 1, wherein the at least one processor is further configured to:
 determine the position coordinates of the boundary line between the first area and the second area acquired by the vision sensor, based on the position coordinates of the mobile robot that is changed according to travel of the mobile robot, and
 update the determined position coordinates of the boundary line to generate the map of the first area.

5. The mobile robot of claim 1,
 wherein the first area includes a lawn area,
 wherein the second area includes a non-lawn area, and
 wherein the vision sensor is further configured to:
  detect a lawn to distinguish the first area and the second area, and
  acquire position information of a boundary line between the lawn area and the non-lawn area.

6. The mobile robot of claim 1,
 wherein the one or more beacons comprise at least two beacons,
 wherein the mobile robot travels between the two beacons installed in advance, and
 wherein in case the mobile robot is located within a predetermined distance from the one or more beacons, the at least one processor is further configured to:
  distinguish and recognize the first area and the second area while rotating at a predetermined angle, and
  acquire the position information of the boundary line while travelling along the boundary line between the first area and the second area.

7. The mobile robot of claim 1, wherein the signal transmitted from the one or more beacons to the one or more tags comprises an ultra-wideband (UWB) signal.

8. The mobile robot of claim 1, further comprising:
 an alert configured to emit a warning sound regarding a travel inoperability situation of the mobile robot,
 wherein the alert is further configured to emit the warning sound in case an obstacle is located on the travelling path of the mobile robot or in case the first area and the second area are unable to be distinguished and recognized on the travelling path of the mobile robot.

9. The mobile robot of claim 1, further comprising:
 a display configured to display a warning message regarding a travel inoperability situation of the mobile robot,
 wherein the display is configured to display the warning message in case an obstacle is located on the travelling path of the mobile robot or in case the first area and the second area are unable to be distinguished and recognized on the travelling path of the mobile robot.

10. The mobile robot of claim 1, further comprising:
 a transceiver configured to transmit data related to at least one of a warning sound or a warning message regarding a travel inoperability situation of the mobile robot to a user terminal.

11. A method of controlling a mobile robot including one or more tags configured to receive a signal from one or more beacons, the method comprising:
 receiving the signal from the one or more beacons;
 determining position coordinates of the mobile robot based on pre-stored position information of the one or more beacons;
 distinguishing and recognizing a first area and a second area on a travelling path of the mobile robot;
 acquiring position information of a boundary line between the first area and the second area;
 determining position coordinates of the boundary line based on the determined position coordinates of the mobile robot and the acquired position information of the boundary line; and
 generating a map of the first area while travelling along the determined position coordinates of the boundary line,
 wherein the determining of the position coordinates of the boundary line includes determining the position coordinates of the boundary line based on a distance to the boundary line and an angle of the boundary line with respect to the determined position coordinates of the mobile robot.

12. The method of claim 11,
 wherein the acquiring of the position information includes receiving the signals from the one or more beacons, which includes three or more beacons, and
 wherein the determining of the position coordinates of the mobile robot includes determining the position coordinates of the mobile robot based on distances between each of the three or more beacons and the one or more tags.

13. The method of claim 11,
 wherein the mobile robot includes the one or more tags including three or more tags,
 wherein the receiving of the position information includes receiving, by each of the three or more tags, the signals from the one or more beacons, and
 wherein the determining of the position coordinates of the mobile robot includes determining the position coordinates of the mobile robot based on distances between each of the three or more tags and the one or more beacons.

14. The method of claim 11, wherein the generating of the map of the first area includes:
 determining the position coordinates of the boundary line between the first area and the second area acquired by a vision sensor, based on the position coordinates of the mobile robot that is changed according to travel of the mobile robot, and
 updating the determined position coordinates of the boundary line to generate the map of the first area.

15. The method of claim 11,
 wherein the first area includes a lawn area,
 wherein the second area includes a non-lawn area, and
 wherein the acquiring of the position information of the boundary line between the first area and the second area includes:
  detecting a lawn to distinguish the first area and the second area, and
  acquiring position information of a boundary line between the lawn area and the non-lawn area.

16. The method of claim 11,
 wherein the one or more beacons comprise at least two beacons,
 wherein the mobile robot travels between the two beacons installed in advance, and
 wherein in case the mobile robot is located within a predetermined distance from the one or more beacons, the method further comprises:
  distinguishing and recognizing the first area and the second area while rotating at a predetermined angle, and
  acquiring the position information of the boundary line while travelling along the boundary line between the first area and the second area.

17. The method of claim 11, further comprising:
emitting a warning sound regarding a travel inoperability situation of the mobile robot; and
displaying a warning message regarding a travel inoperability situation of the mobile robot,
wherein the emitting of the warning sound includes emitting the warning sound in case an obstacle is located on the travelling path of the mobile robot or in case the first area and the second area are unable to be distinguished and recognized on the travelling path of the mobile robot, and
wherein the displaying of the warning message includes displaying the warning message in case an obstacle is located on the travelling path of the mobile robot or in case the first area and the second area are unable to be distinguished and recognized on the travelling path of the mobile robot.

18. The method of claim 11, further comprising:
transmitting data related to at least one of a warning sound or a warning message regarding a travel inoperability situation of the mobile robot to a user terminal,
wherein the transmitting of the data related to the at least one of the warning sound or the warning message includes:
transmitting the data related to the at least one of the warning sound or the warning message in case an obstacle is located on the travelling path of the mobile robot or in case the first area and the second area are unable to be distinguished and recognized on the travelling path of the mobile robot.

\* \* \* \* \*